US006865148B1

(12) United States Patent
Ben-Zur et al.

(10) Patent No.: US 6,865,148 B1
(45) Date of Patent: Mar. 8, 2005

(54) METHOD FOR ROUTING NETWORK SWITCHING INFORMATION

(75) Inventors: Raanan Ben-Zur, Campbell, CA (US); Steven L. Shepherd, Monte Sereno, CA (US); Boris Reynov, Cupertino, CA (US); Bayne G. Steele, Pleasanton, CA (US); Nicholas A. Balatoni, Santa Clara, CA (US)

(73) Assignee: Ciena Corporation, Linthicum, MD (US)

( * ) Notice: Subject to any disclaimer, the term of this patent is extended or adjusted under 35 U.S.C. 154(b) by 626 days.

(21) Appl. No.: 09/663,512

(22) Filed: Sep. 15, 2000

(51) Int. Cl.[7] .............................................. G01R 31/08
(52) U.S. Cl. ...................................... 370/218; 370/540
(58) Field of Search ................................ 370/217, 218, 370/221, 222, 404, 465, 537, 540, 907

(56) References Cited

U.S. PATENT DOCUMENTS

| | | | | | |
|---|---|---|---|---|---|
| 5,870,382 | A | * | 2/1999 | Tounai et al. ................ | 370/220 |
| 5,905,854 | A | * | 5/1999 | Nielson et al. ................. | 714/6 |
| 5,923,653 | A | * | 7/1999 | Denton ........................ | 370/375 |
| 6,105,079 | A | * | 8/2000 | Kuo et al. ..................... | 710/25 |
| 6,587,470 | B1 | * | 7/2003 | Elliot et al. .................. | 370/404 |
| 6,614,753 | B2 | * | 9/2003 | Ikawa ......................... | 370/222 |
| 6,633,573 | B1 | * | 10/2003 | Ben-Zur et al. ............. | 370/405 |

FOREIGN PATENT DOCUMENTS

| EP | 570882 A2 | * | 11/1993 | ............ H04Q/11/04 |
|---|---|---|---|---|
| WO | WO 9847255 A1 | * | 10/1998 | ............. H04J/14/02 |

OTHER PUBLICATIONS

Anelli, P. et al. "Evaluation of the APS Protocol for SDH Rings Reconfiguration". IEEE Transactions on Communications. Sep. 1999. vol. 47. iss. 9. pp. 1386–1393.*
Safaei, F. "A 'Fragmented' Restoration Scheme for Flat Network Architectures". IEEE Global Telecommunications Conference, 1998. Nov. 8–12, 1998. vol. 6. pp. 3763–3767.*

* cited by examiner

*Primary Examiner*—John Pezzlo
*Assistant Examiner*—Donald L Mills
(74) *Attorney, Agent, or Firm*—Michael R. Cammarata; Chad J. Billings

(57) ABSTRACT

A method for routing network switching information includes generating at one Time Slot Network (TS Net) data firame from at least one data frame of a first type. The TS Net data frame comprises switching event information. The TS Net data frame is transferred and stored among a number of network elements using a backplane network. Compare operations are performed among prespecified data frames of the TS Net data frame, and at least one interrupt signal is generated in response to detected changes resulting from the compare operations. Information routing is controlled in at least one network and the associated network elements in response to the interrupt signals.

39 Claims, 30 Drawing Sheets

| BIT | 7 (MSB) | 6 | 5 | 4 | 3 | 2 | 1 | 0 (LSB) |
|---|---|---|---|---|---|---|---|---|
| FUNCTION | BRDSTS1 | BRDSTS0 | 1 | 1 | 1 | 1 | 1 | 1 |

| STSB1 | STSB0 | INTERPRETATION |
|---|---|---|
| 0 | 0 | PRESENT & FAILED (OR NOT BOOTED) |
| 0 | 1 | PRESENT & INACTIVE |
| 1 | 0 | PRESENT & ACTIVE |
| 1 | 1 | NOT PRESENT |

FIG. 19

| PARAMETER | DESCRIPTION | MIN | MAX |
|---|---|---|---|
| TXS | TRANSMIT SKEW | | 30 NSEC |
| TXD | TRANSMIT DELAY | | 60 NSEC |
| TRS | RECEIVE SETUP | 30 NSEC | |
| TRH | RECEIVE HOLD | 60 NSEC | |

FIG. 21

| BYTE | | POS. | | POS. | | POS. | |
|---|---|---|---|---|---|---|---|
| 0 | K1 PORT 1 | 1 | K2 PORT 1 | 2 | K1 PORT 2 | 3 | K2 PORT 2 |
| 4 | K1 PORT 3 | 5 | K2 PORT 3 | 6 | K1 PORT 4 | 7 | K2 PORT 4 |
| 8 | K1 PORT 5 | 9 | K2 PORT 5 | 10 | K1 PORT 6 | 11 | K2 PORT 6 |
| 12 | K1 PORT 7 | 13 | K2 PORT 7 | 14 | K1 PORT 8 | 15 | K2 PORT 8 |
| 16 | K1 PORT 9 | 17 | K2 PORT 9 | 18 | K1 PORT 10 | 19 | K2 PORT 10 |
| 20 | K1 PORT 11 | 21 | K2 PORT 11 | 22 | K1 PORT 12 | 23 | K2 PORT 12 |
| 24 | K1 PORT 13 | 25 | K2 PORT 13 | 26 | K1 PORT 14 | 27 | K2 PORT 14 |
| 28 | K1 PORT 15 | 29 | K2 PORT 15 | 30 | K1 PORT 16 | 31 | K2 PORT 16 |
| 32 | E1 PORT 1 | 33 | F1 PORT 1 | 34 | SPARE | 35 | SPARE |
| 36 | SPARE | 37 | SPARE | 38 | SPARE | 39 | SPARE |
| 40 | SPARE | 41 | SPARE | 42 | SPARE | 43 | SPARE |
| 44 | SPARE | 45 | SPARE | 46 | SPARE | 47 | SPARE |
| 48 | SPARE | 49 | SPARE | 50 | SPARE | 51 | SPARE |
| 52 | SPARE | 53 | SPARE | 54 | SPARE | 55 | SPARE |
| 56 | SPARE | 57 | SPARE | 58 | SPARE | 59 | SPARE |
| 60 | SPARE | 61 | SPARE | 62 | SPARE | 63 | SPARE |

FIG. 22

METHOD FOR ROUTING NETWORK SWITCHING INFORMATION

BACKGROUND

1. Field of the Invention

This invention relates to the field of Synchronous Optical Network (SONET) technology. In particular, the invention relates to increasing the efficiency of SONET communications by minimizing the response time for the performance of protection switching.

2. Description of the Related Art

Synchronous Optical Networks (SONET) are fiber-optic transmission systems for high-speed digital traffic. The SONET technology is an intelligent system that provides advanced network management and a standard optical interface. The SONET technology is typically deployed in SONET rings that originate and terminate in a carrier's facility. FIG. 1 is a typical simple SONET ring 100. While SONET networks or rings can be quite complex, the typical SONET network 100 includes numerous network elements 102–112 linked by upstream and downstream communication fibers 120. A ring 100 may span only a few miles or stretch thousands of miles, depending on its purpose. The network elements available for use in SONET networks 100 include terminal multiplexers (TMs), add-drop multiplexers (ADMs), digital loop carriers (DLCs), digital cross-connects (DCSs), matched nodes (MNs), and drop and repeat nodes (D+R).

The network elements typically used in SONET rings 100 include ADMs and DCSs. An ADM is a device that connects individual lines to backbone trunks and multiplexes lower-speed electrical and/or optical signals into a high-speed optical channel and vice versa. A DCS is a network device used to switch and multiplex low-speed voice and data signals onto high-speed lines and vice versa.

The SONET rings are self-healing in that they use two or more transmission paths among network nodes and, if there is a break in one path or a loss of signal in one path, network traffic may be rerouted around the damaged path. This path protection switching provides alternate signal paths among network nodes and is a major advantage in the deployment of rings. For the best security against failure, when possible, different physical routes are used for the two transmission paths. The SONET technology typically supports levels of service including optical carrier (OC) and synchronous transport signal (STS). Optical carrier service refers to optical signals, and synchronous transport signal refers to electrical signals.

In operation, a switching event is generated in a SONET ring in response to a network condition that threatens service quality. When a switching event occurs in a SONET ring, the event is detected and the information necessary to provide alternate signal paths using protection switching is propagated among the network elements of the ring. Each network element along the propagation path detects the switching event and propagates the protection switching information to the next element in the ring. The switching event information is transferred through the network using two bytes of the SONET frame, referred to as the K1 and K2 bytes.

A problem arises in SONET ring protection switching in that the time allowed for propagation of switching event information among network elements is limited to a total of 50 milliseconds. Typically, numerous switching events can be occurring simultaneously in a number of network elements as a result of a single switching event propagating along the network and adversely affecting many network elements. As such, the propagation time problem is compounded. Therefore, as the number of network elements in a ring increases, the propagation time allowed between each element decreases. For example, if a ring contains 16 nodes, the propagation time is reduced to approximately 3 milliseconds between each node.

The switching event detection and propagation problem is further compounded by the control structure of a typical SONET ring. The control structure is provided in order to control network elements in providing alternate signal paths during path switching initiated by a switching event. A typical control structure couples a number of network elements to a central processor hub or card via Ethernet connections. Information regarding switching events, when propagated, is detected by network elements along the propagation path. The network elements transfer the detected information to the processor hub using the Ethernet coupling. The processor hub, while communicating with and receiving switching event information from a number of network elements, processes the information and initiates appropriate action via communications with the affected network elements.

The problem arises in that, as numerous network elements are typically receiving the switching event information at about the same time, a number of network elements are communicating with the processor hub regarding the switching event information at about the same time. This leads to information collisions in the processor hub. When an information collision occurs, the information or data involved in the collision is returned to the source network element where it is held for at least some prespecified period of time before being recommunicated. For example, some systems may hold returned data for approximately 5 milliseconds before attempting recommunication. As a result of these information collisions, the propagation time limits are often violated in typical rings.

This collision problem might be reduced using switched mode Ethernet couplings. However, the switched mode is much more expensive and space consuming because it requires more processing power and additional space to implement the switch logic. As there is a need to reduce the expense and physical size of the SONET equipment, the switched mode would not provide a viable solution.

Another solution to this problem might be found using bus connections among the nodes. This, too, is problematic in that the bus requires more interconnection among nodes and results in an architecture where a single point failure is fatal. As such, a bus fault would result in a system failure. While a dual redundant bus might prevent the single point of failure, it requires significantly more interconnection among nodes and introduces a complex control system. Consequently, a method and apparatus is needed that minimizes the response time in the performance of protection switching in SONET networks or rings.

SUMMARY

The TS Net provides switching event information among TMO switch cards in a TS Net data frame transferred over a separate TS Net backplane so as to avoid delays associated with data collisions. The TS Net couples the outputs of the switch cards of a TMO switch to the input of each switch card using a number of backplane communication channels. The backplane communication channels form a bus that is coupled to the input of all switch cards. Switching event information from each switch card in the form of K1/K2 bytes, along with the E1/F1 bytes and card status information, are assembled into the TS Net data frame. The TS Net data frame includes a payload of 67.5 bytes transmitted as a serial bit stream at 4.32 MHz. The TS Net data frame is transferred among all TMO switch cards using the backplane communication channels or bus.

The TS Net data frame payloads are stored in a number of memory areas using multiple level data storage and mapping. At prespecified intervals, compare operations are performed among subsequently received net data frame payloads and the stored payloads of previous TS Net data frames. A unit interrupt is generated by a switch card in response to a detected switching event, as indicated by a bit change or bit inequality in at least one byte of the compared TS Net data frames during the compare operation. Further, a massive interrupt is generated in response to a unit interrupt in any switch card. In response to the massive interrupt, a TMO switch processor is directed to the memory location containing the detailed switching event data using a multiple level read operation, wherein the processor is efficiently directed through multiple TS Net data memory areas or partitions. The switching event data is evaluated and the switching event dealt with accordingly, thereby minimizing response time in the performance of protection switching over that in typical SONET systems.

The descriptions provided herein are exemplary and explanatory and are intended to provide examples of embodiment of the claimed invention.

BRIEF DESCRIPTION OF THE FIGURES

The accompanying figures illustrate embodiments of the claimed invention. In the figures:

FIG. 19 shows status bit combinations of a status byte and associated interpretations of an embodiment.

FIG. 21 shows TS Net timing parameters of an embodiment.

FIG. 22 is a TS Net data frame payload byte assignment of an embodiment.

DETAILED DESCRIPTION

The Trans-Metro Optical (TMO) switch system of an embodiment uses a non-binding architecture that includes integrating discrete subsystems including SONET network elements with a backplane and interchangeable line cards. In addition to performing digital cross-connect (DCS) and add-drop multiplexer (ADM) functions with a common card, the TMO switches support the typical packet and circuit transport protocols. Packet support encompasses asynchronous transfer mode (ATM) service access multiplexers/ switches, frame relay (FR) access switches, and multi-protocol label and internet protocol (IP) (MPLS/IP) switches. Circuit switching support is provided for voice and private line point-to-point circuits. Consequently, the TMO switch provides a data optimized SONET platform which integrates SONET ADMs, DCSs and ATM/FR switch functionality into a single platform.

The typical metropolitan area network (MAN) hierarchy is a mix and match of SONET sub-networks, subsystems, protocols, and overlay networks. The TMO switch of an embodiment provides for cost-effective simplification or flattening of the typical MAN transport hierarchy by transitioning SONET to a data-centric traffic model using data-optimized SONET ring or mesh topologies integrated with the TMO switches. Integration of the TMO switch allows for preservation of technology investments by allowing users to retain their local area networks (LAN) protocol (Ethernet, ATM, FR, IP) and time division multiplexing (TDM) services. Furthermore, bandwidth is preserved as the TMO switches of an embodiment provide 4:1 statistical multiplexing.

Figure 1:
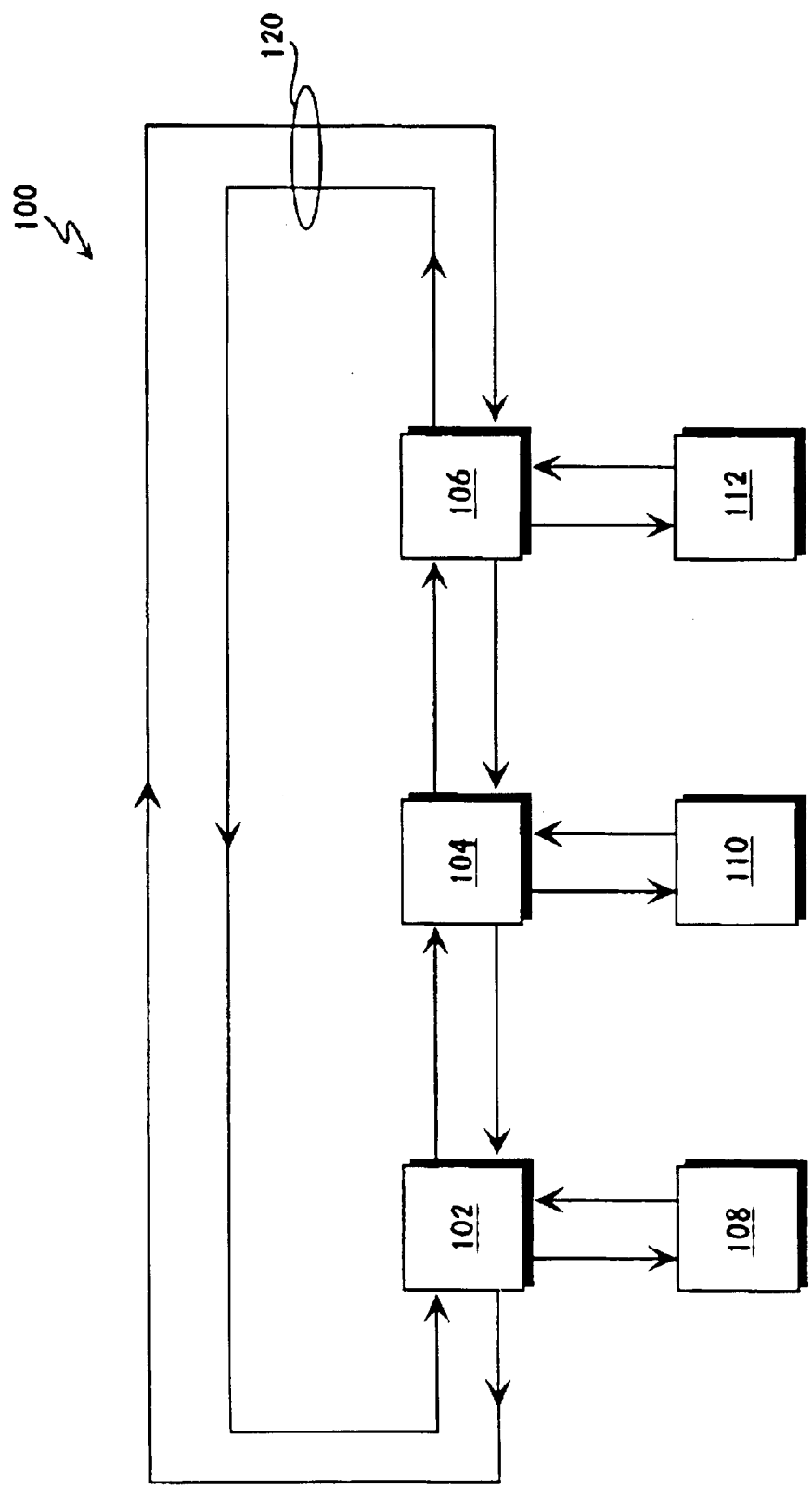
FIG. 1 is a typical prior art simple Synchronous Optical Network (SONET) ring.
Figure 2:
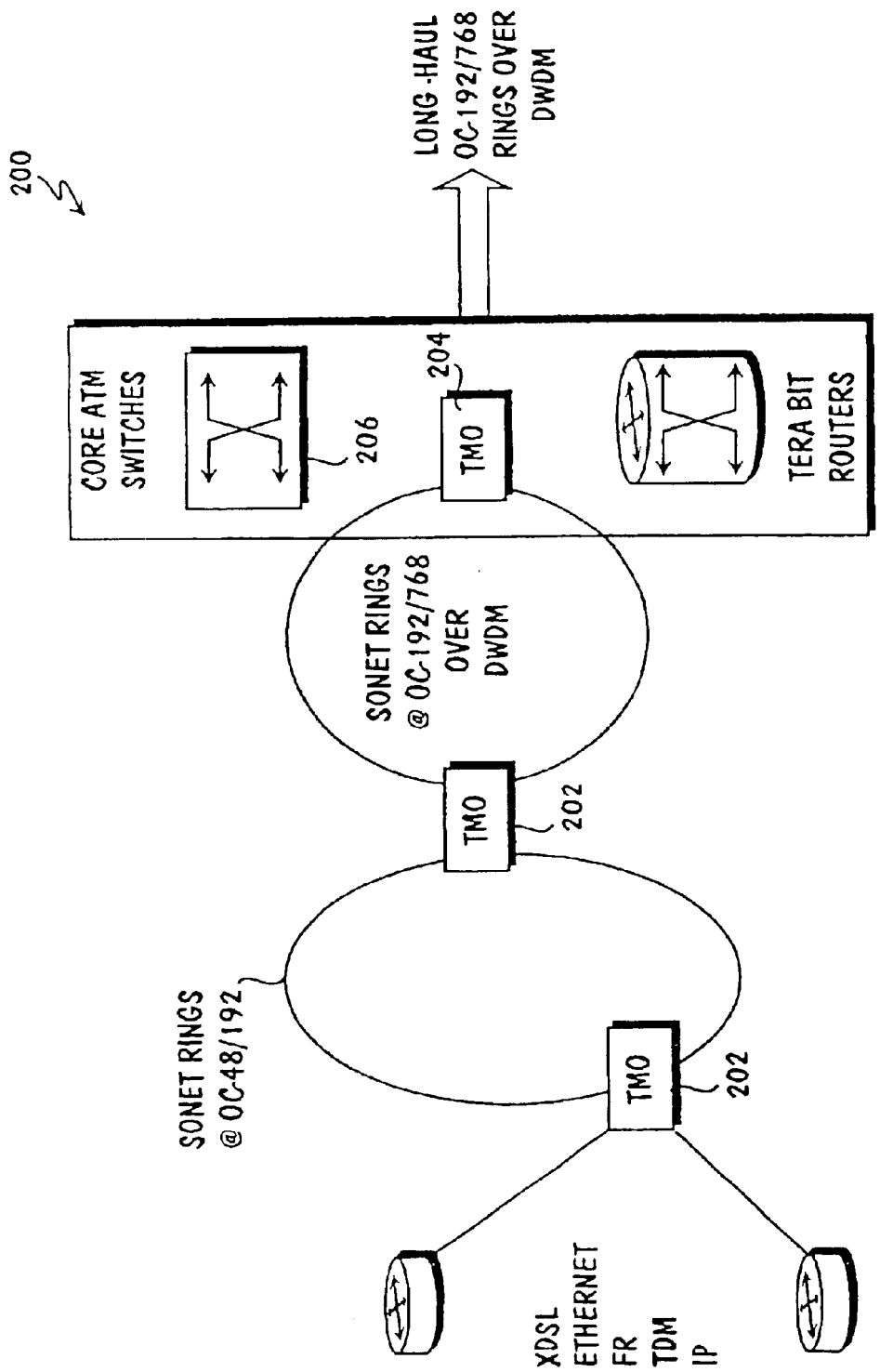
FIG. 2 is a SONET trans-metro hierarchy enabled by Trans-Metro Optical (TMO) switches of an embodiment.

FIG. 2 is a SONET trans-metro hierarchy 200 enabled by Trans-Metro Optical (TMO) switches of an embodiment. Service access multiplexers are replaced with TMO switches 202 at the ingress/egress points of OC-12 to OC-192 local loops and at OC-48 to OC-768 MAN edges. The TMO switches 202 support the typical range of SONET line rates, and eliminate the discrete network elements typically required at each OC-n add/drop point. The TMO switching 264 is further used to couple the MAN edge with the network core. At this point, core ATM switches 206 groom aggregated traffic for transport over long haul OC-192/768 Dense Wavelength Division Multiplexing (DWDM) spans.

Figure 3:
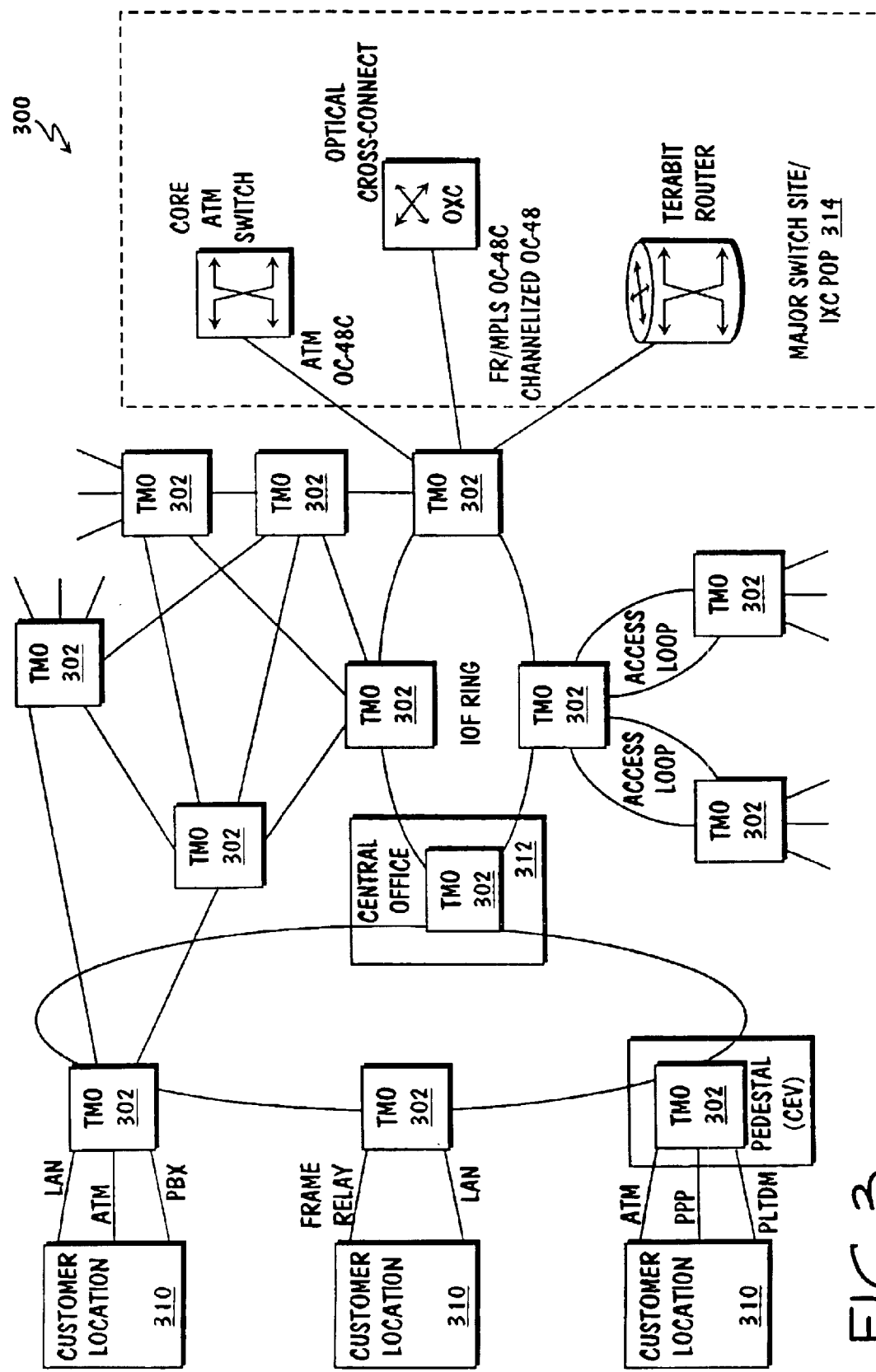
FIG. 3 is a SONET network hierarchy enabled by TMO switches of an embodiment.

FIG. 3 is a SONET network hierarchy 300 enabled by Trans-Metro Optical (TMO) switches 302 of an embodiment. The TMO switches 302 provide a streamlined SONET network hierarchy 300 among customer premises 310, central office (CO) 312, and major switch sites/interexchange carrier (IXC) points of presence (POPs) 314. Further, TMO switches can be used as customer premises equipment (CPE) for enterprises customers deploying a true OC-n multi-service transport topology. Regardless of their network location, TMO switches support all typical cell packet traffic including, but not limited to, ATM, FR; point-to-point protocol (PPP), IP, and LAN.

The TMO switch of an embodiment is a data optimized SONET platform that integrates SONET ADMs, DCSs and ATM/FR switch functionality into a single-platform using common card architecture. The TMO switch scales from DS1/DS3/OC-3/OC-12/OC-48 to OC-192 in a single shelf, but is not so limited. The system can handle up to OC-768 capacity in a single shelf. A fast Ethernet or Gigabit Ethernet, and ATM switch card can be added to provide data interfaces to the TMO switch. This configuration also supports OC-3c, OC-12c, and OC-48c. The TMO switch also provides 42 lambda DWDM support for both OC-48 and OC-192.

The TMO switch shelf is a carrier class network element. Although it can be used in different locations of the telecommunications networks, it can be used anywhere within the Trans-Metro space. The TMO switch base system includes a 16 slot chassis supporting any service in any slot, a 480 Gbps, 32 layer backplane to handle TDM and data traffic, and 1536 synchronous transport signal (STS) matrix capacity. Four of the slots are dedicated to double wide redundant Common Controller Cards (CCCs). The remaining 12 slots are configurable for any other interface unit except the OC-192 unit, which is a double wide card that occupies four slots next to the CCCs.

The TMO switch supports OC-3(c) and OC-12(c) optical interfaces when the TMO switch is used as an OC-48 SONET ADM. Additionally, the OC-48(c) line speed interfaces can also be utilized for drop traffic if the TMO switch is configured as an OC-192 ADM. In addition to a wide variety of optical interfaces, the TMO switch also supports DS1 and DS3 interfaces as well as ATM, Frame Relay, 10/100 baseT and Gigabit Ethernet. Further tributary interfaces including OTC3, AC1T, AC45T, OTCQ, and OTC 48 are supported in an embodiment.

The OTC3 provides four OC-3 SONET compliant circuits on a single interface card. This interface unit provides the TMO switch shelf the flexibility to support standard payload size as well as any combination of concatenated STSs. When the TMO switch shelf is fully equipped with OTC3 interface units it provides 20, 1+1 protected OC-3 circuits for an equivalent of 60 STSs.

The AC1T interface card provides a total of 28 DS1 circuits for the TMO switch shelf. This interface unit provides a clear channel mapping of DS1s into the SONET VT1.5. Both long haul and short haul protections are provided. When fully equipped with DS1s, the TMO switch shelf provides a total of 140, 1:1 protected DS1 circuits.

The AC45T interface card provides a total of 24 DS3 circuits for the TMO switch shelf. This interface unit provides a clear channel mapping of DS3s into a SONET STS. When fully equipped with DS3s, the TMO switch shelf provides a total of 120, 1:1 protected DS3 circuits.

The OTCQ interface unit provides four optical ports that can be configured for either OC-3 or OC-12 line rates, on a card by card basis. This interface unit provides the TMO switch shelf the flexibility to support standard payload size as well as any combination of concatenated STSs.

Since the TMO switch accommodates OC-192 high-speed line rates, the OC-48 interface unit is also considered a tributary drop line card. The OTC48 interface unit provides four optical ports that can be configured for either OC-3 or OC-12 line rates. This interface unit provides the TMO switch shelf the flexibility to support standard payload size as well as any combination of concatenated STSs.

The TMO switch of an embodiment supports system architectures including but not limited to linear ADM (1:0, 1:1, 1+1), terminal ADM (1:0, 1:1, 1+1), UPSR, 2FBLSR, 4FBLSR, and in-line Optical/Electrical Repeater. In one embodiment, one shelf can support up to 1 OC-192 (1+1 protected), 6 OC-48 (1+1 protected), 72 OC-12s (1+1 protected), 72 OC-3s (1+1 protected), 144 DS3s (1:1 protected) and 140 DS1s (1:1 protected).

The DCS card has a built-in matrix of 768×768 STS-1s, with DS-3 granularity, but is not so limited. If granularity down to the DS-1 rate is provided, a virtual tributary (VT) switch card is also available which supports a 1344×1344 VT1.5 (or VT2.0) matrix. Any DS-3 port can be coupled to any other DS-3 port and any DS-1 port can be coupled to any other DS-1 port across the entire chassis. The TMO switch can drop a DS-1 from an OC-192.

Regarding narrow band transmitters, the TMO switch of an embodiment supports 42 DWDM channels, but is not so limited. A channel plan that spaces channels according to the 100 gigahertz (GHz) International Telecommunication Union (ITU) grid and refer to 191.1 THz to 196.0 THz, (inclusive) allows the TMO switch system to be utilized with 16 and 32 wavelength channel plans.

The TMO switch supports up to OC-192 on the high-speed side and has a 480 Gbps backplane that supports OC-768. On the line side, the TMO switch has the ability to drop the full OC-192 bandwidth and has a full TSI/TSA cross-connect matrix (DCS functionality) of 768×768 (with STS-1 granularity) and a 1344×1344 (with DS1 granularity). Interface slot cards are added to move, in-service, all traffic. This provides the OC-192 or OC-768 upgrade with minimum impact to existing traffic.

The TMO switch provides for standard concatenated signals. Additionally, for data traffic grooming and management, the TMO switch also provides for arbitrary concatenation of STS signals, thereby allowing for higher bandwidth efficiency when supplying data services to end customers.

The TMO switches of an embodiment provide other advantages over typical SONET equipment as they minimize response time in the performance of protection switching using a backplane that includes a Time Slot Network (TS Net). This TS Net, running at a frequency of approximately 8 kilohertz (kHz), minimizes the response time required to perform protection switching in response to detected SONET switching events among elements of the TMO switch. As described herein, the ADM, DCS, and ATM/FR switch functionality is provided with TMO switch elements including, but not limited to, common controller cards (CCCs) or boards, optical/line cards or boards, and trunk cards or boards.

The CCCs of an embodiment comprise two cards including both a DCS and a processing card, but are not so limited. The processing card, or processor card, includes at least one processor or microprocessor or central processing unit (CPU) that supports an on-board Ethernet hub and the provision of timing signals. The line cards may not provide ring support and, as such, include a single 1×16 memory register into which status inputs are received from the TS Net. The trunk cards include memory registers to accommodate the transfer of TS Net data frames between the processor card and other network elements.

In operation, the TS Net of an embodiment couples the outputs of all TMO switch cards to the input of each switch card using a number of backplane communication channels. Switching event information from each switch card in the form of K1/K2 bytes, along with the E1/F1 bytes and card status information, are assembled into a TS Net data frame. The TS Net data frame includes a payload of 67.5 bytes transmitted as a serial bit stream at 4.32 MHz. The TS Net data frame is transferred among all TMO switch cards using the backplane communication channels. The TS Net data frame payloads are stored using multi-level data storage and mapping. A compare operation is performed among the stored and mapped payloads of consecutive TS Net data frames at prespecified intervals, and interrupt signals including unit interrupt signals and a massive interrupt signal are generated in response to a switching event as indicated by a bit change in at least one byte of the compared TS Net data frames. A processor is efficiently directed to the memory location of the switching event data using a multiple level memory read. The switch event data is evaluated and the switching event dealt with accordingly, thereby minimizing response time in the performance of protection switching over that in typical SONET systems.

Another advantage realized by the TMO switches of an embodiment over the prior art is that they are capable of performing distributed processing. While prior art SONET systems send all switching event and status information to a central processor, the TMO switch is capable of supporting distributed processing of network element or event information among all TMO switch cards as each switch card includes a processor. Thus, the processing of network information can be distributed among cards of the TMO switch, further increasing system efficiency.

Figure 4:
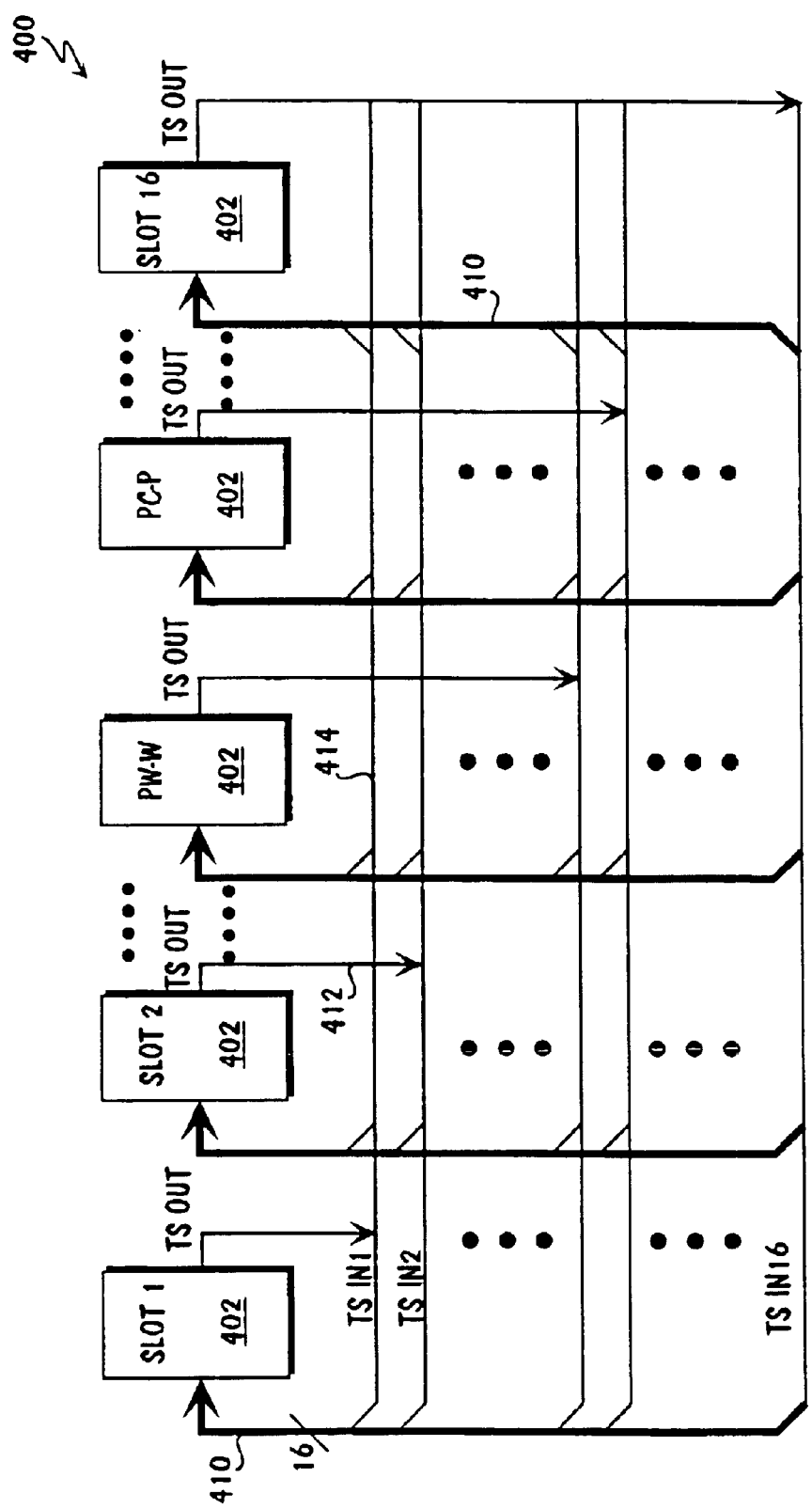
FIG. 4 is a block diagram of a Time Slot Network (TS Net) backplane of an embodiment.

FIG. 4 is a block diagram of a Time Slot Network (TS Net) backplane 400 of an embodiment. The TS Net backplane 400 includes couplings among the system cards and among circuitry components of each card. The TS Net backplane 400 couples each system card 402 to accept 16 inputs and provide one output 412. The output 412 of each card 402 is coupled to the input of every card 402, thereby providing each-card 402 with information from every other card within 250 microseconds, but the embodiment is not so limited.

In so doing, the TS Net backplane 400 provides a separate communication channel 414 for each card 402 in the TMO switch, for a total of 16 channels. The TS Net backplane 400 of an embodiment includes a 16-channel bus 410 where each card 402 of each TMO switch slot drives an output onto a corresponding communication channel 414 of the bus. The 16 communication channels 414 together form the bus 410, and the bus 410 is coupled to the input of each system card 402.

Figure 5:
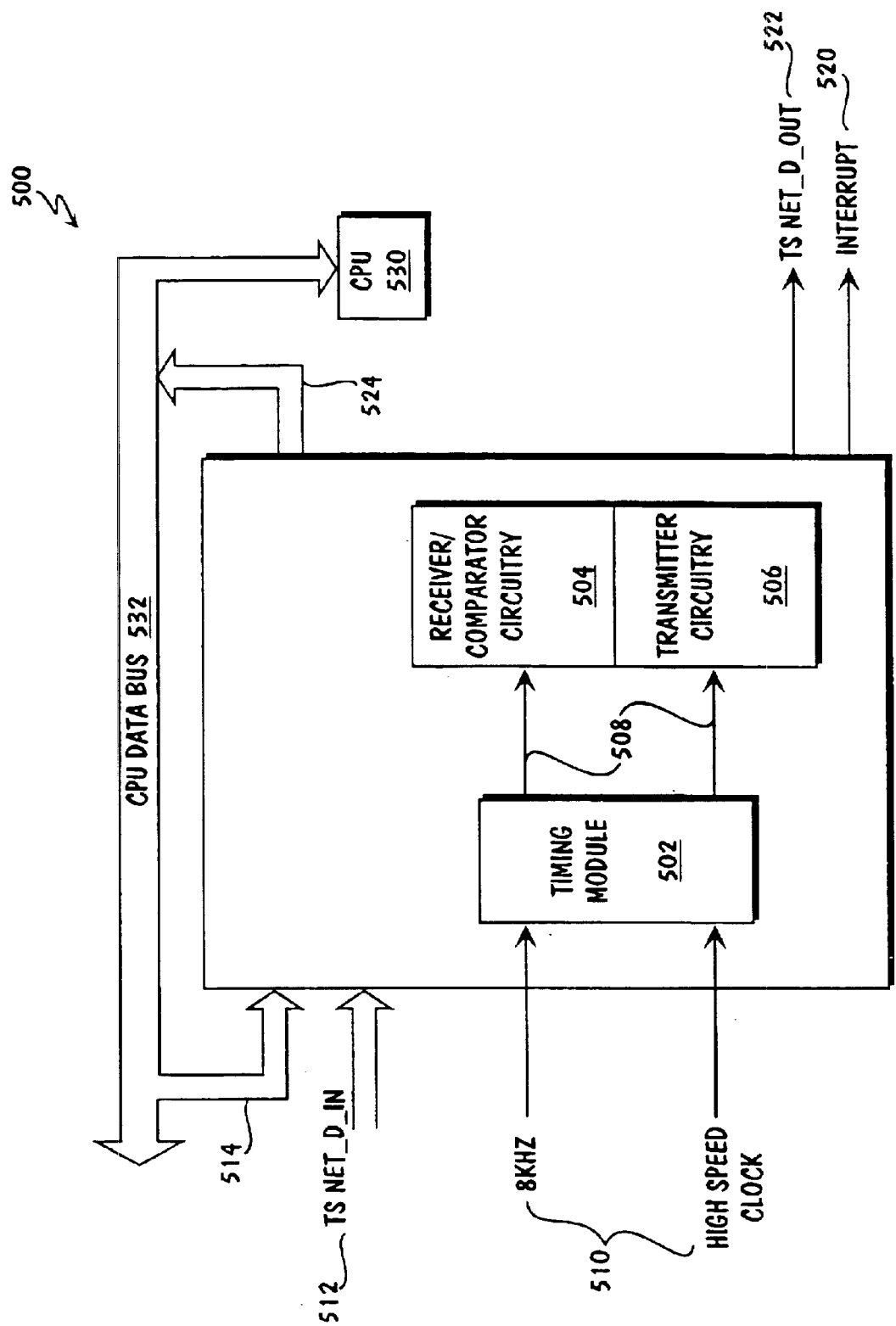
FIG. 5 is a block diagram of TS Net components of an embodiment.

FIG. 5 is a block diagram of TS Net components 500 of an embodiment. The TS Net components 500 comprise, but are not limited to, switch card components 502–506 including a timing module 502, receiver/comparator circuitry 504, and transmitter circuitry 506. The TS Net components 500 are coupled to receive clock signals 510, TS Net data 512, and data 514 from a processing unit 530, or central processing unit (CPU). The components 500 are further coupled to provide interrupt signals 520, TS Net data 522, and CPU data 524, but are not so limited.

The switch card components 502–506 of a card are coupled among the processor 530, or CPU, and components of other switch cards using a CPU data bus 532 and the TS Net backplane 400. While only one set of switch card components 502–506 are shown, the switch card component functions are repeated once for each switch card of a TMO switch. Therefore, a TMO switch containing 16 switch cards would include 16 sets of switch-card components. Further, alternate embodiments-could share some or all switch card components among one or more switch cards.

The switch card components 502–506 are coupled to receive TS Net data (TSNet_D_in) 512 and transmit TS Net data (TSNet_D_out) 522 in the form of TS Net data frames over the TS Net backplane. The switch card components 502–506 are also coupled to receive and provide data from the CPU 530 over the CPU data bus 532 of an embodiment. In an embodiment, one CPU performs the processing functions, and the CPU is located on a particular switch card or in some specified location in the TMO switch and data is provided among various switch components using the CPU data bus. In an alternate embodiment, the processing function can be distributed among processors resident on numerous system cards or in numerous locations throughout the TMO switch, wherein the CPU data bus couples the various processing elements. In another alternate embodiment, the processing function can be distributed among all of the cards of the TMO switch, wherein a CPU data bus or even a data backplane couples all of the processors.

The timing module 502 receives clock signals 510 that include an 8 kHz clock signal and at least one high speed clock signal. The high speed clock signal includes either a 77.76 MHz clock signal or a 66 MHz clock signal. Furthermore, the high speed clock signal includes signals having a frequency at least three times the specified data rate, wherein the specified data rate of an embodiment is 4.32 MHz, but is not so limited.

The timing module 502 generates a number of clock signals and control signals 508 for the receiver/comparator circuitry 504 and transmitter circuitry 506 from the 8 kHz clock signal and the high speed clock signal. In an embodiment, each card drives a TS Net data frame, or net data frame, onto an associated communication channel. The net data frame is synchronized to one of the 8 kHz clock signals that are distributed from a processor of the active CCC. A separate 8 kHz clock is provided from each CCC, including working and protect clocks. The logic to select the 8 kHz clock driven by the active CCC is provided in software and hardware, but is not so limited. As the cards transmit their net data frames aligned to, and synchronous with, the 8 kHz clock, the receiving circuitry does not need a clock or frame sync signal to retrieve the data.

One typical method of synchronizing components of a network involves transmitting a high frequency clock signal of an appropriate frequency to each card. The problem with this method is that the high frequency clock signal is very noisy, and distribution of this noisy signal throughout a system results in interference among network components. The TS Net of an embodiment reduces system noise by providing a single low frequency synchronization signal throughout the TMO switch to at least one phase-locked loop (PLL). The low frequency signal has a frequency of 8 kHz, but is not so limited. A PLL can reside on each system card or at some other location in the TMO switch, but is not so limited. The PLL generates a local high frequency clock signal in response to the low frequency synchronization signal. The distribution of a low frequency synchronization signal in the TMO switch results in noise reduction throughout the TMO switch.

The TS Net of an embodiment functions by providing switching event information among TMO switch cards in a TS Net data from transferred over the TS Net backplane. The receiver/comparator circuitry receives and stores the TS Net data frame payloads using multi-level data storage and mapping. The receiver/comparator circuitry also performs compare operations among subsequently received net data frame payloads and previously stored payloads of consecutive TS Net data frames at prespecified intervals. When the compare operation results in an inequality among the subsequently received data and the stored data, interrupt signals including unit interrupt signals and a massive interrupt signal are generated in response to the corresponding switching event. The data inequality is indicated by a bit change in at least one byte of the compared TS Net data frames. The interrupt signals are generated using multiple levels of logic registers. In response to the interrupt signals, the processor is directed to the memory location of the switching event data using a multiple level read operation in which the processor is efficiently directed through the multiple level registers to the appropriate switching event data.

FIGS. 6–9 show block diagrams of TS Net component circuitry that, while used in a DCS, could be used in the other types of TMO switch cards including processor cards, optical cards, and other interface cards. Furthermore, while the TS Net is described herein as it is configured and used in SONET, it is not so limited, and embodiments of the TS Net or alternatives thereof can be used in other network technologies.

Figure 6:
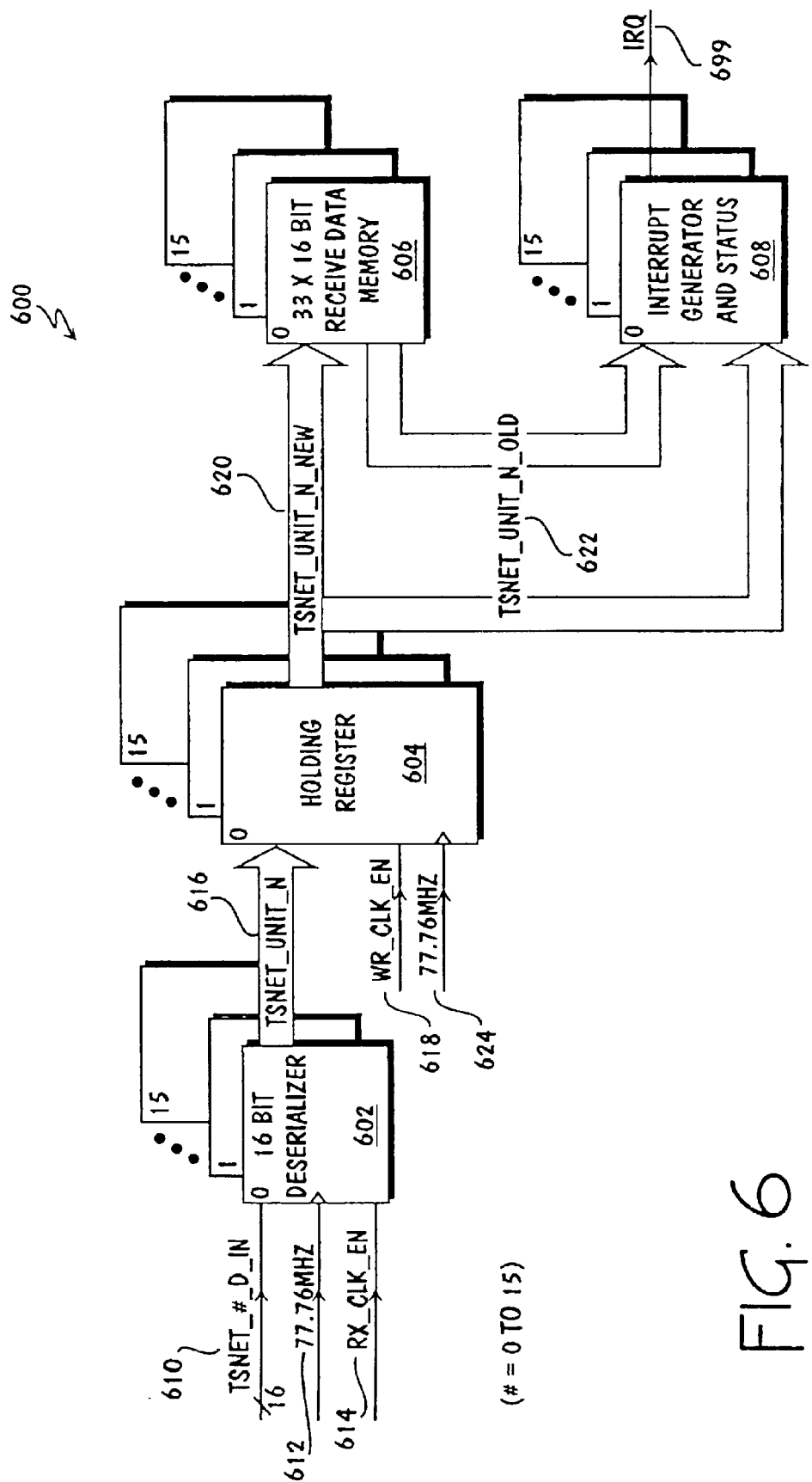
FIG. 6 is a block diagram of TS Net receiver/comparator circuitry of an embodiment.

FIG. 6 is a block diagram of TS Net receiver/comparator circuitry 600 of an embodiment. The receiver/comparator circuitry 600, or receiver, includes a de-serializer 602, or serial-to-parallel data converter, at least one holding register 604, at least one receive data memory 606, and at least one interrupt generator 608. The receive data memory 606 is a dual port memory, but is not so limited. The receiver 600 accepts inputs including serial net frame data (TSNet_#_D_in) 610, a 77.76 MHz clock signal 612, and a receiver clock enable signal (Rx_clk_en) 614, and, in response, outputs information 699 in response to detected switching events. As discussed herein, the switch card component functions are repeated once for each switch card of a TMO switch. Therefore, a TMO switch containing 16 switch cards includes 16 sets of receiver/comparator circuitry 600. As such, the TSNet_#_D_in signal 610 is a 16-channel signal, wherein each card receives a corresponding net frame data signal (# represents the particular net frame data signal for each of switch cards 0 to 15).

The serial net frame data signal 610 is converted to parallel signals 616 using the 16-bit deserializer 602, or serial-in-parallel-out (SIPO) converter. The deserializer 602 receives net frame data 610 from a corresponding backplane channel along with the 77.76 MHz clock signal 612 and the receive clock enable signal 614. The deserializer 602 converts each 16-bit net frame data unit into 16 parallel signals 616 with each signal representing a corresponding bit of the net frame data unit. These parallel signals 616 are provided to the holding register 604 along with a write clock enable signal (wr_clk_en) 618 and the 77.76 MHz clock signal 624. Further, the parallel signals TSNet_unit_n_new) 620 are provided to the receive data memory 606 and the interrupt generator and status circuitry 608.

The interrupt generator and status circuitry 608 is also provided net frame data units previously stored in the receive data memory (TsNet_unit_n_old) 622. The interrupt generator, and status circuitry 608 performs a bit-by-bit comparison among the most recently received net data frame unit 620 and at least one corresponding unit 622 previously stored in the receive data memory. The comparison is performed at prespecified intervals. When the compare operation results in any inequality among a newly received data bit and a stored data bit, a unit interrupt signal 699 is generated and provided as an output from receiver 600. The bit change represents a switching event in corresponding K1/K2 bytes.

Figure 7:
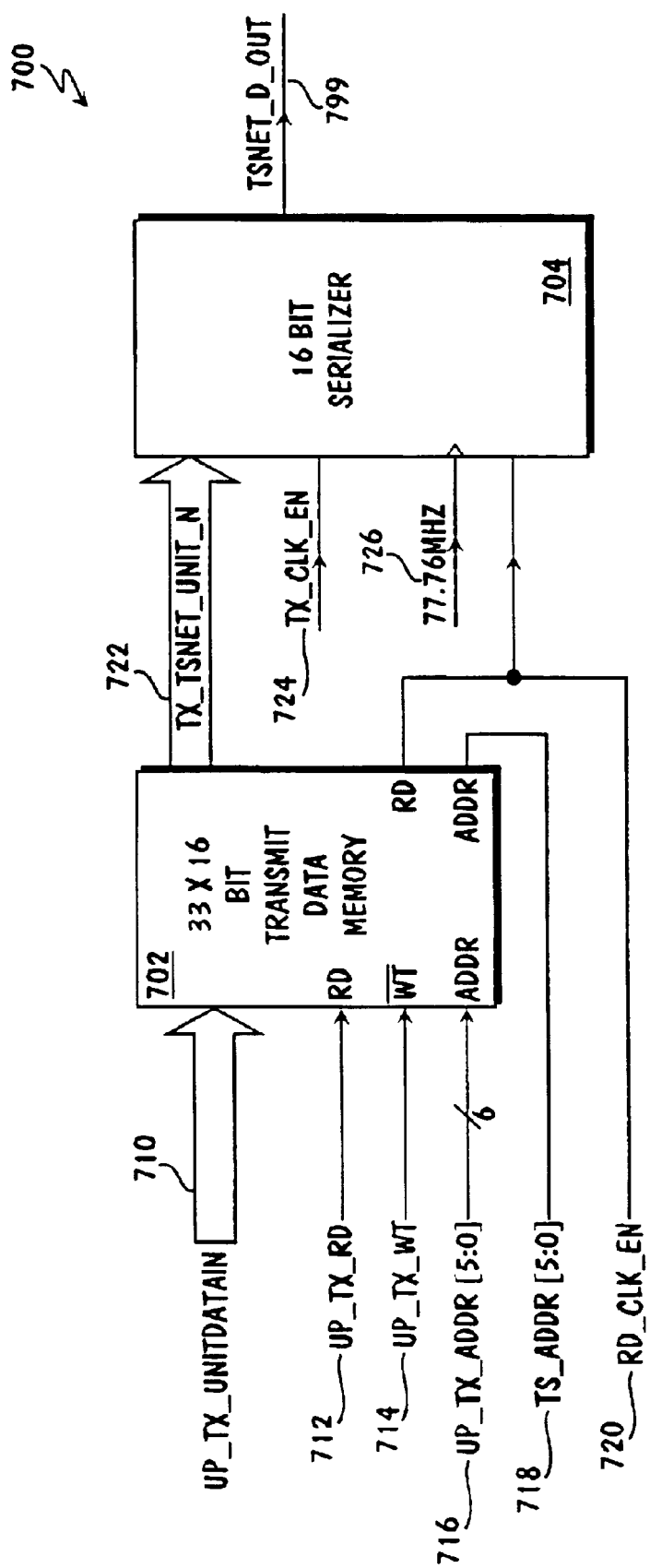
FIG. 7 is a block diagram of TS Net transmitter circuitry of an embodiment.

FIG. 7 is a block diagram of TS Net transmitter circuitry 700 of an embodiment. The transmitter circuitry 700, or transmitter, includes at least one transmit data memory 702 and at least one 16-bit serializer 704, or parallel-to-serial converter, coupled among a TMO switch processor or microprocessor or CPU and the TS Net. The transmit data memory 702 is a dual port memory, but is not so limited.

The transmit data memory 702 receives data signals from the CPU (up_tx_unitdatain) 710 along with a transmit read signal (up_tx_rd) 712, a transmit write signal (up_tx_wt) 714, and address signals (up_tx_addr [5:0]) 716. The transmit data memory 702 further receives read address signals (ts_addr [5:0]) 718 and a read clock enable signal (rd_clk_en) 720 from the TS Net. In response to data 710 received from the CPU, the transmit data memory 702 provides parallel unit data 722 to the serializer 704. The serializer 704 also receives a transmit clock enable signal (tx_clk_en) 724, a 77.76 MHz clock signal 726, and a read clock enable signal (rd_clk_en) 720 from the TS Net. The serializer 704 outputs. TS Net data frames (TSNet_D_out) 799 to the TS Net backplane.

While the receiver circuitry and transmitter circuitry are used in optical cards of an embodiment, they are not so limited. In support of low latency inter-processor communication, the TS Net provides memory mapped registers that allow a card to transmit or receive data. The CCC provides the capability to receive any data from any other slot and transmit 64 bytes of data per net data frame. The optical cards allow software to transmit 64 bytes per net data frame, wherein selected bytes are configured to be driven by hardware. Optical cards allow software to receive 64 bytes per net data frame from the active CCC, wherein selected bytes are configured to be passed directly via hardware.

Figure 8:
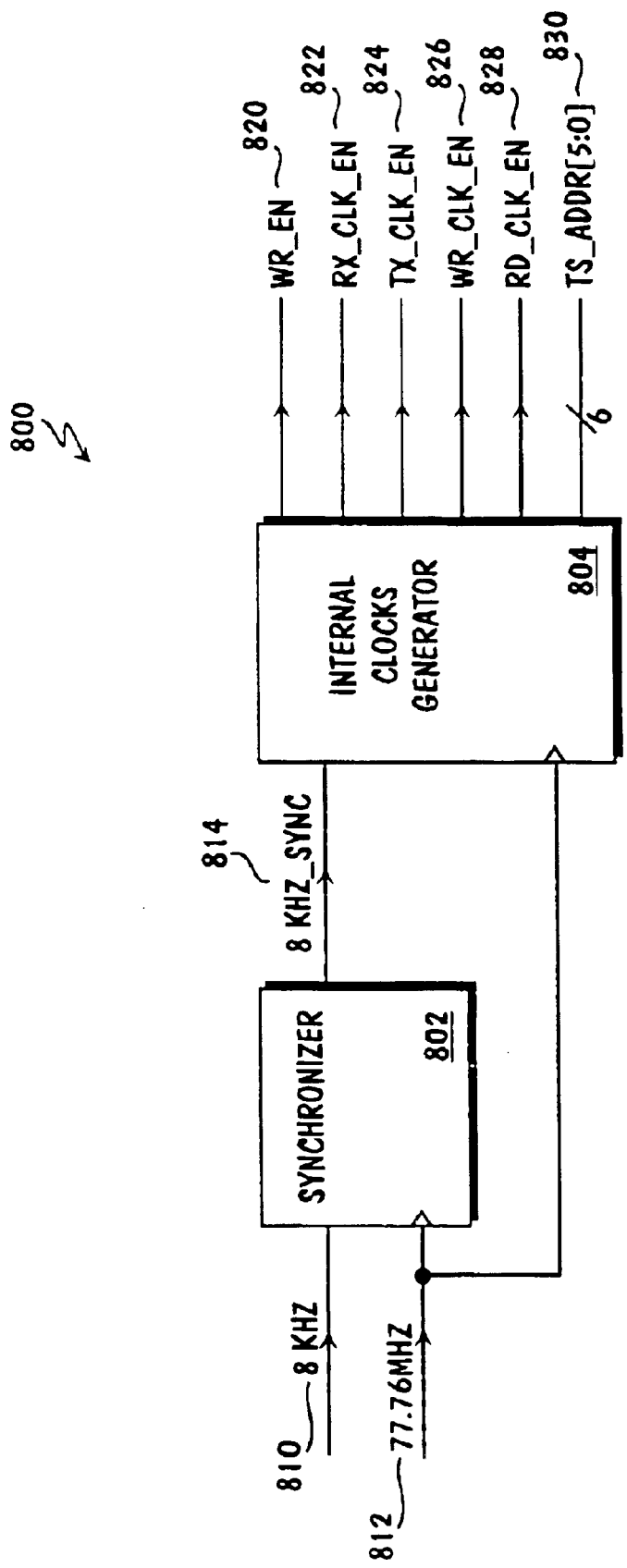
FIG. 8 is a block diagram of TS Net timing module circuitry of an embodiment.
Figure 9:
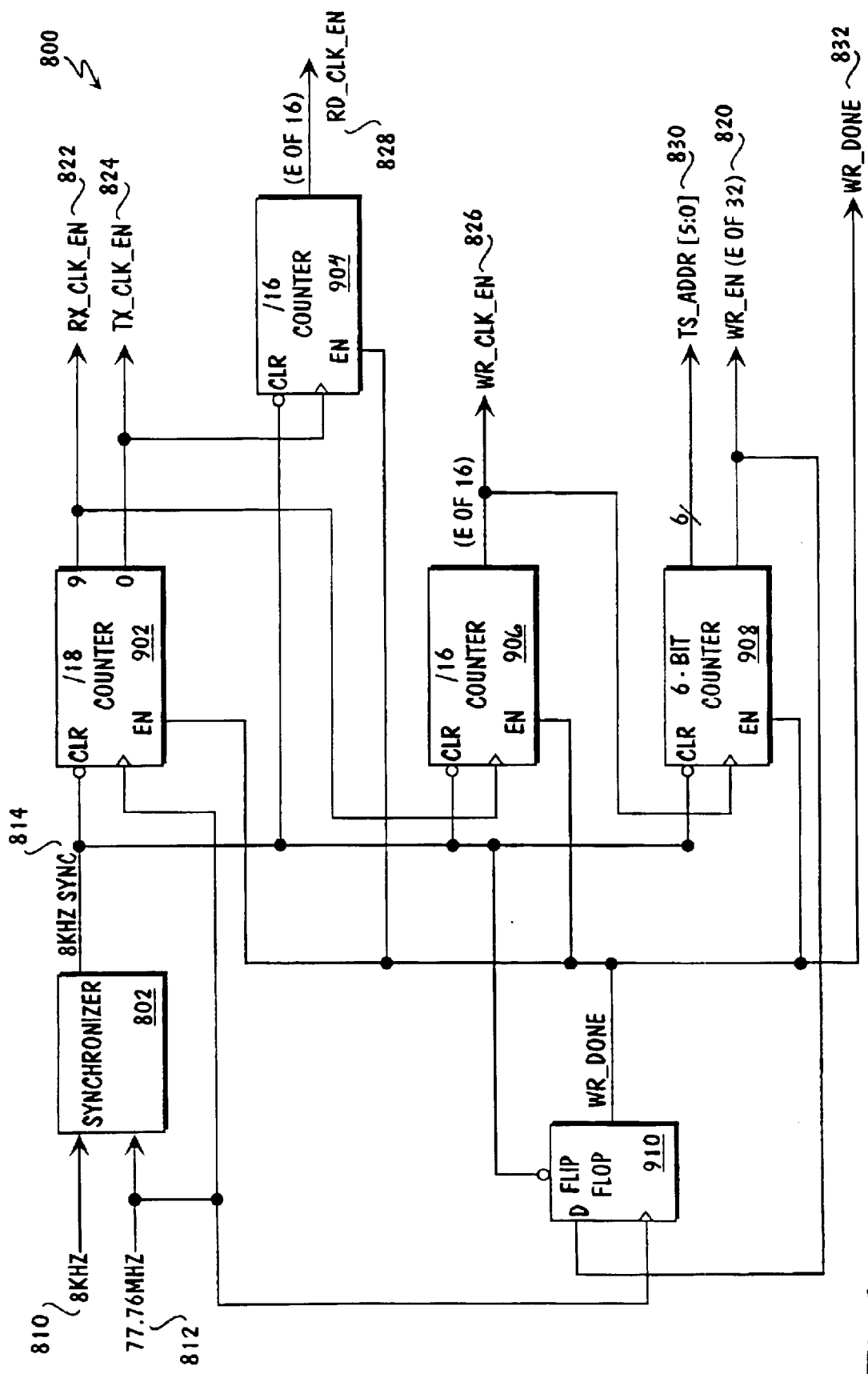
FIG. 9 is another block diagram of TS Net timing module circuitry of an embodiment.
Figure 10:
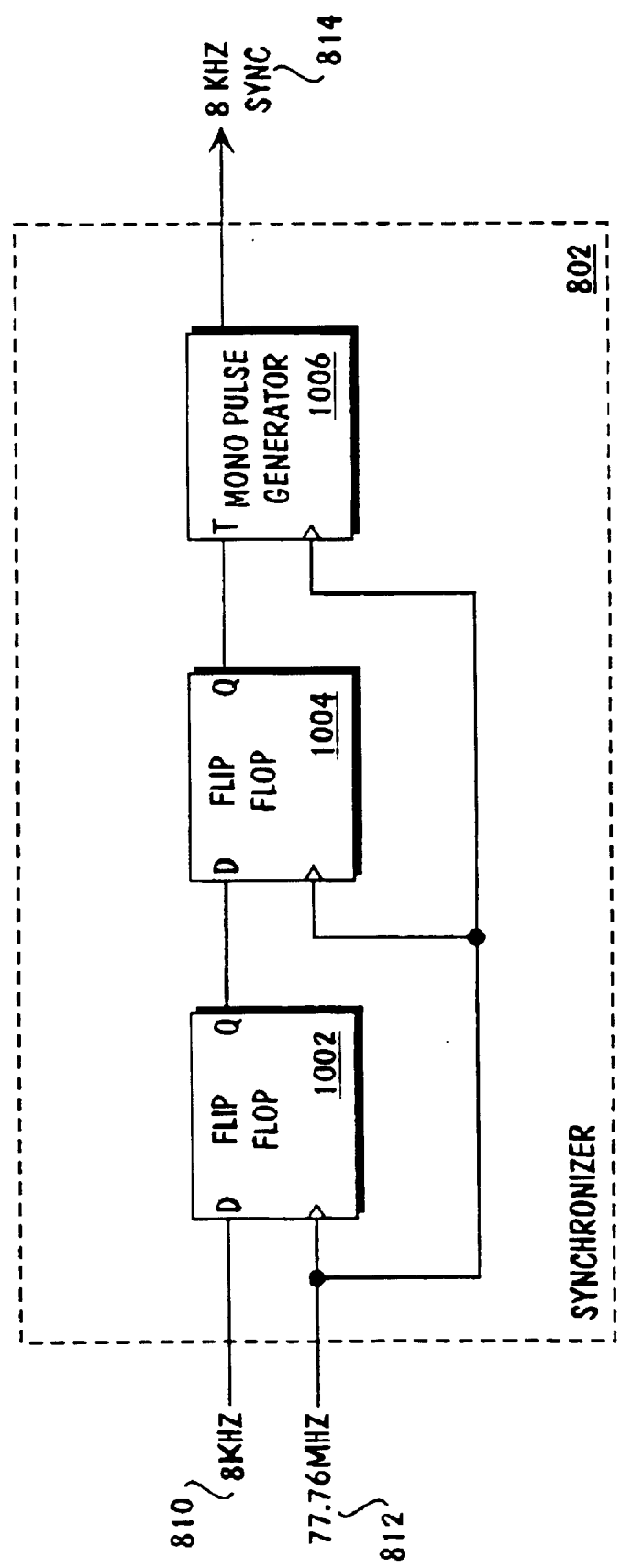
FIG. 10 is a synchronizer of TS Net timing module circuitry of an embodiment.

FIGS. 8 and 9 are block diagrams of TS Net timing module circuitry 800 of an embodiment. FIG. 10 is a synchronizer 802 of TS Net timing module circuitry 800 of an embodiment. The timing module 800 couples inputs including an 8 kHz clock signal 810 and a 77.76 MHz clock signal 812 to the synchronizer 802. The synchronizer 802, including two flip flops 1002 and 1004 and a monopulse generator 1006, provides an 8 kHz synchronization signal 814, or sync signal, to the internal clock generator 804. The sync signal 814 is therefore synchronized to the 77.76 MHz clock signal, 812. The internal clock generator 804 comprises at least one divide-by-18 counter 902, two divide-by-16 counters 904 and 906, at least one 6-bit counter 908, and at least one flip flop 910.

The internal clock generator 804, in response to the received 8 kHz sync signal 814 and the 77.76 MHz clock signal 812, or high speed clock signal, provides outputs to TS Net receiver/comparator circuitry and TS Net transmitter circuitry. The outputs include, but are not limited to, a write enable signal (wr_en) 820, a receive clock enable signal (rx_clk_en) 822, a transmit clock enable signal (tx_clk_en) 824, a write clock enable signal (wr_clk_en) 826 a read clock enable signal (re_clk_en) 828, TS Net address signals (ts_addr [5:0]) 830, and a write done signal (wr_done) 832.

A signal timing relationship among internal control signals of an embodiment includes a bit rate clock signal having a frequency of 4.32 megahertz, or approximately 231 nanoseconds cycle time, and a 50% duty cycle. The bit rate clock signal is synchronized with the leading edge of the 8 kHz synchronization signal. The transmit clock enable signal is synchronized on the rising edge of the bit rate clock signal and has a pulse width of approximately 13 nanoseconds. The receive clock enable signal is synchronized on the falling edge of the bit rate clock signal and has a pulse width of approximately 13 nanoseconds.

The transmit unit load signal is synchronized on the rising edge of the bit rate clock signal and has a pulse width of approximately 13 nanoseconds. The transmit unit load signal is issued following every 16 occurrences of a transmit clock enable signal, corresponding to the 16 data bits in a TS Net frame. The receive unit load signal is synchronized on the falling edge of the bit rate clock signal and has a pulse width of approximately 13 nanoseconds. The receive unit load signal is issued following every 16 occurrences of a receive clock enable signal.

Figure 11:
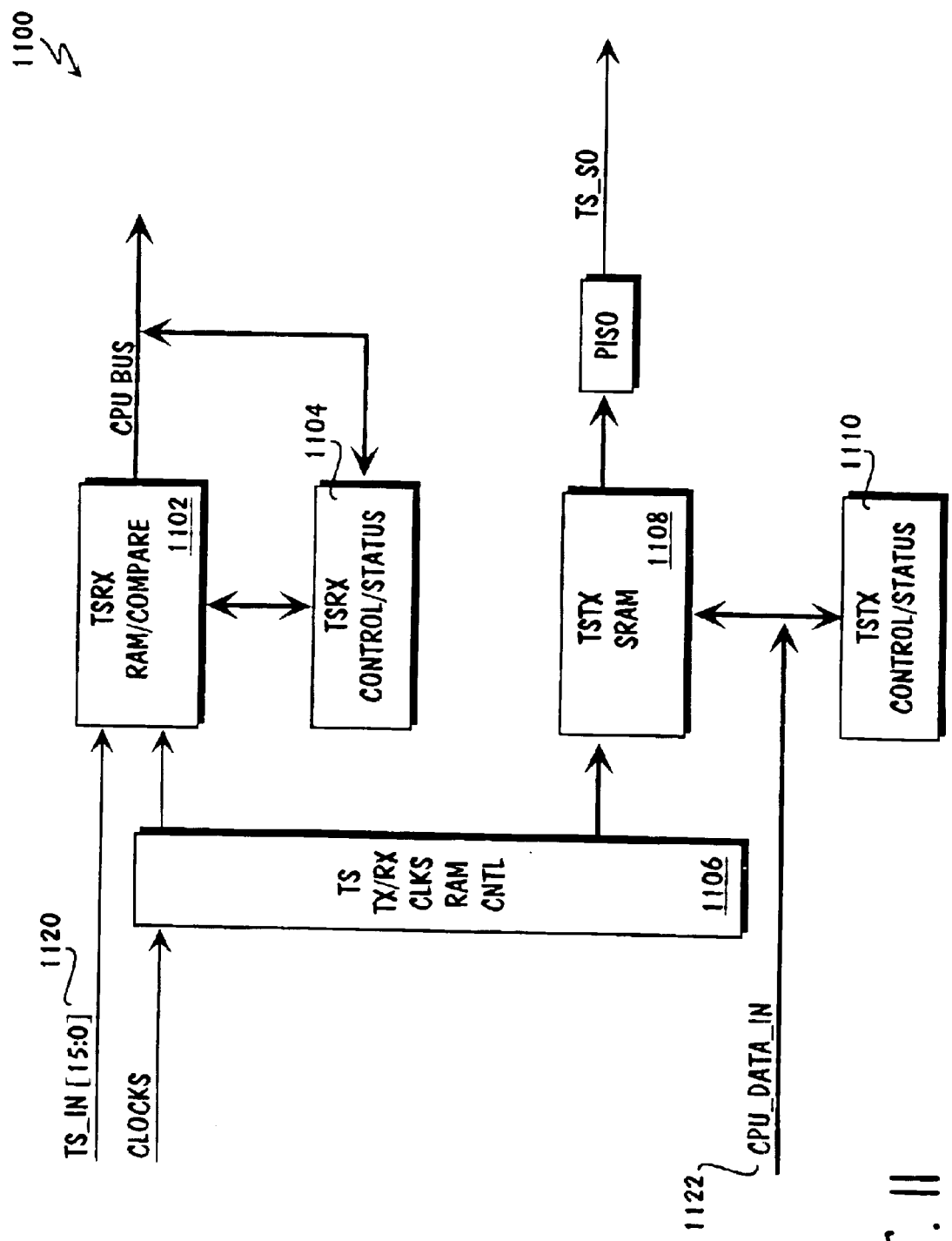
FIG. 11 is an alternate block diagram of a TS Net card interface of an embodiment.

FIG. 11 is an alternate block diagram of a TS Net card interface 1100 of an embodiment. The interface 1100 comprises receiver circuitry, transmitter circuitry, and clock circuitry coupled to transfer TS Net data and processor or CPU data among TMO switch cards, but is not so limited. The receiver circuitry, or card port receiver, includes the TSRX RAM/compare circuitry 1102 and TSRX control/status circuitry 1104 coupled to receive net data frames 1120 from a number of switch cards or ports along with clock information from the clock and memory control circuit 1106. The transmitter circuitry, or card transmitter, includes the TSTX SRAM circuitry 1108 and TSTX control/status circuitry 1100 coupled to receive processor data 1122 along with clock information from the clock and memory control circuit 1106.

In operation, the interface 1100 receives 16 serial data streams (ts_in[15:0]) 1120 corresponding to each TMO switch card or port. Logic implemented in at least one field programmable gate array (FPGA) (not shown) stores 1056 bytes of net frame payload data (e.g., 64 bytes per signal for each of 16 signals per frame, plus 2 status bytes per signal for each of the 16 signals), and monitors the status information. The FPGA can be located in a switch card, in another switch component or system, or distributed among a number of switch components or systems. Further, 64 bytes of interrupt status data (e.g., 4 bytes per signal for each of 16 signals) as well as 64 bytes of interrupt mask data are received. Moreover, there are 2 bytes of interrupt status data received related to a B0/B1 status signal. A processor has write access to any of the 1056 bytes. If a change is detected in any net frame data for some prespecified number of frames, the interrupt logic generates an interrupt to the processor and stores the new value. The processor specifies the number of frames over which a change in data is to be maintained, but the embodiment is not so limited.

Figure 12A:
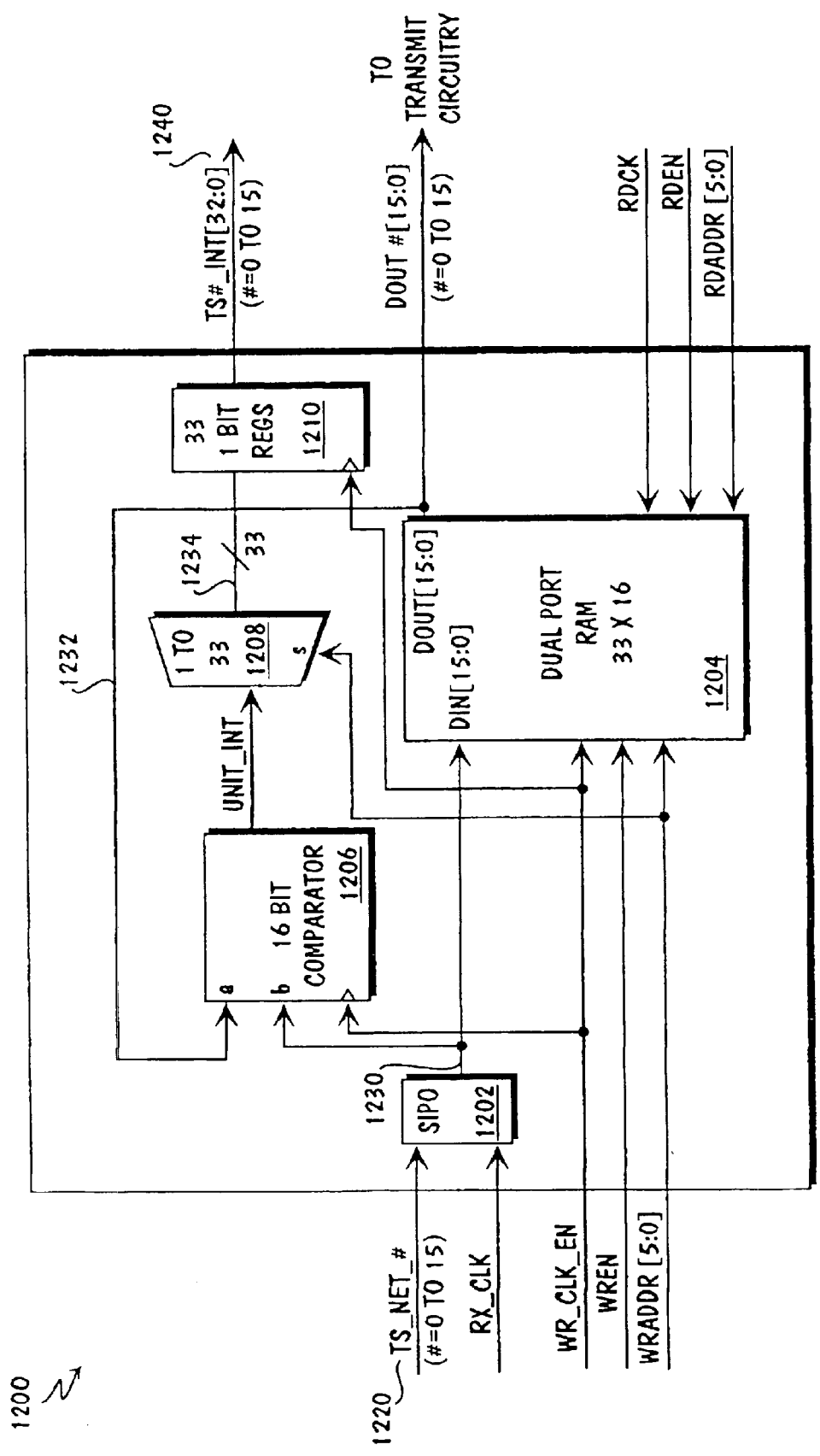
FIGS. 12A and 12B are alternate block diagrams of TS Net receiver circuitry of an embodiment.
Figure 12B:
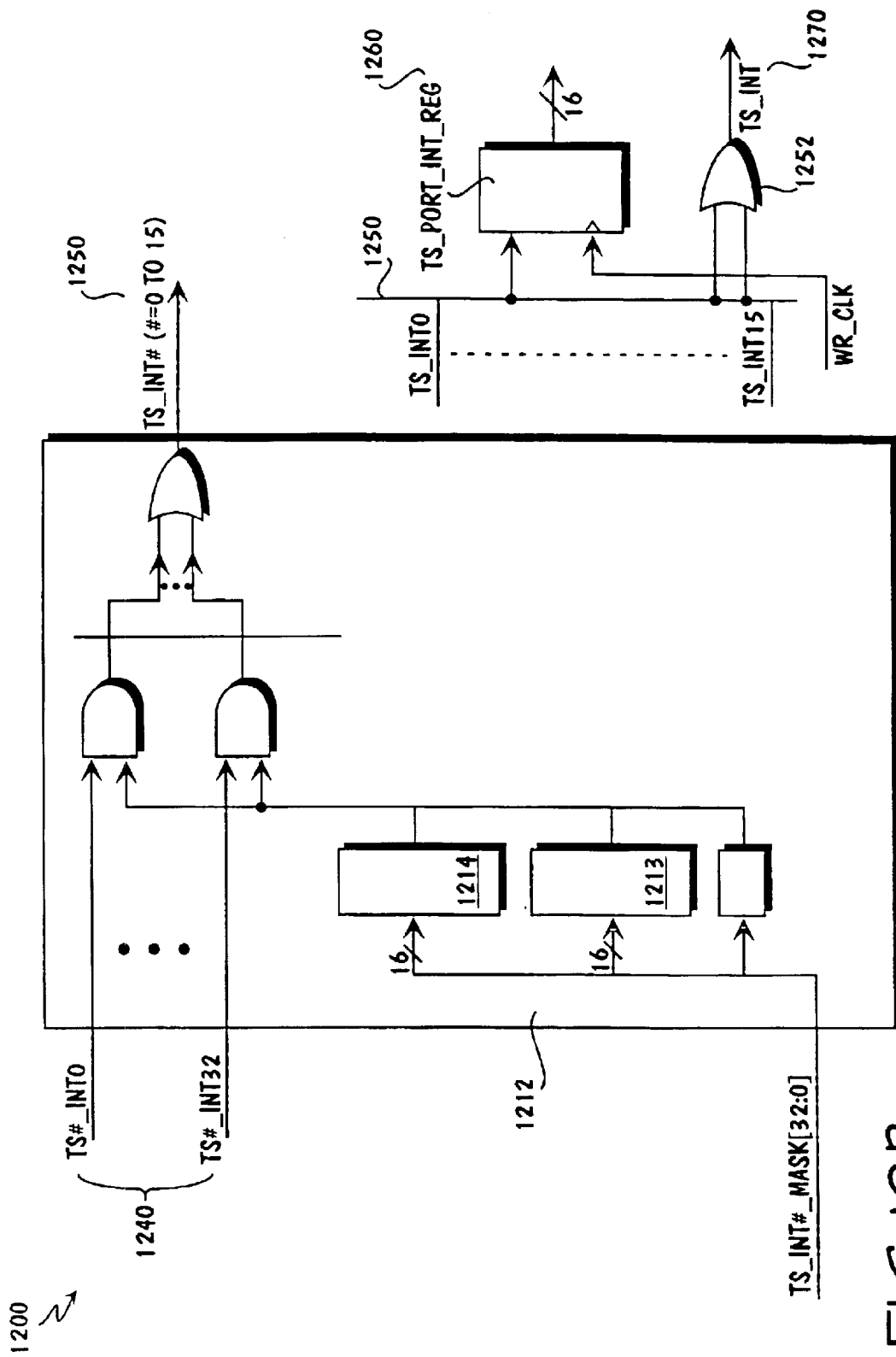

FIGS. 12A and 12B are alternate block diagrams of TS Net receiver circuitry 1200 of an embodiment. The TS Net receiver circuitry 1200 is repeated for each TMO switch card or the ports of a switch card; therefore, the TS Net receiver circuitry 1200 is repeated 16 times in an embodiment, but is not so limited. The receiver circuitry 1200, or receiver, includes a serial-to-parallel data converter (SIPO) 1202, at least one dual port 33×16 random access memory (RAM) 1204, a 16-bit compare register 1206, a multiplexer 1208, at least one status or unit register 1210, and unit interrupt circuitry 1212. An embodiment uses two 16-bit unit registers 11210, but is not so limited. The dual port RAM 1204 is initialized by writing logical zeros to all memory locations.

The receiver 1200 accepts inputs including serial net frame data (ts_net_#) 1220 corresponding to an associated TS Net backplane channel. The serial net frame data signal 1220 is converted to parallel signals 1230 by the SIPO 1202. The SIPO 1202 converts each 16-bit net frame data unit into 16 corresponding parallel signals. These parallel signals 1230 are provided to the compare register 1206 and the dual port memory 1204.

The dual port memory 1204 also provides net frame data 1232 from at least one previously stored net data frame to the compare register 1206, wherein a bit-by-bit comparison is performed among the most recently received net data frame unit and the corresponding units of previously stored data from the dual port memory. The comparison is performed at prespecified intervals. When the compare operation results in any inequality among a newly received unit bit and a stored unit bit, a unit interrupt bit 1234 is written to the corresponding memory area or register in the unit register 1210 using the multiplexer 1208. Consequently, the unit register 1210 of each switch card contains one unit interrupt register for each unit of the TS Net data frame.

The unit register contents are provided to the unit interrupt circuitry 1212 of the receiver, wherein the unit register signals 1240 are logically combined to generate a unit interrupt signal (ts_int#) 1250 in response to any unit interrupt represented in the unit registers 1210. Interrupt mask registers 1213 and 1214 are provided and any unit status bits that are not masked can cause a processor interrupt. The unit interrupt signals 1250 from the unit interrupt circuitry 1212 of all switch cards of a TMO switch are written to a port interrupt register area (ts_port_int_reg) 1260 of memory.

Further, the unit interrupt signals 1250 from all switch cards of a TMO switch are logically combined using massive interrupt circuitry 1252 to generate a massive interrupt signal 1270 that is provided to the CPU. The massive interrupt circuitry 1252 is coupled to receive interrupt signals 1250 from each receiver and combine the interrupt signals 1250 using at least one logic element 1252 to provide the massive interrupt signal 1270 to the CCC or at least one distributed processor. The processor can mask and clear any interrupt bits. The bits set in the unit registers 1210 and port interrupt register 1260 hold their set values until individually cleared or reset by a CPU command. The processor of an embodiment clears individual status bits by writing a logic one to the corresponding bit position in the appropriate register. It is noted that while the TS Net unit interrupt circuitry 1212 and massive interrupt circuitry 1252 are described herein as they are configured and used with SONET technology, they are not so limited, and embodiments of this interrupt or alternatives thereof can be used in other network technologies.

Figure 13:
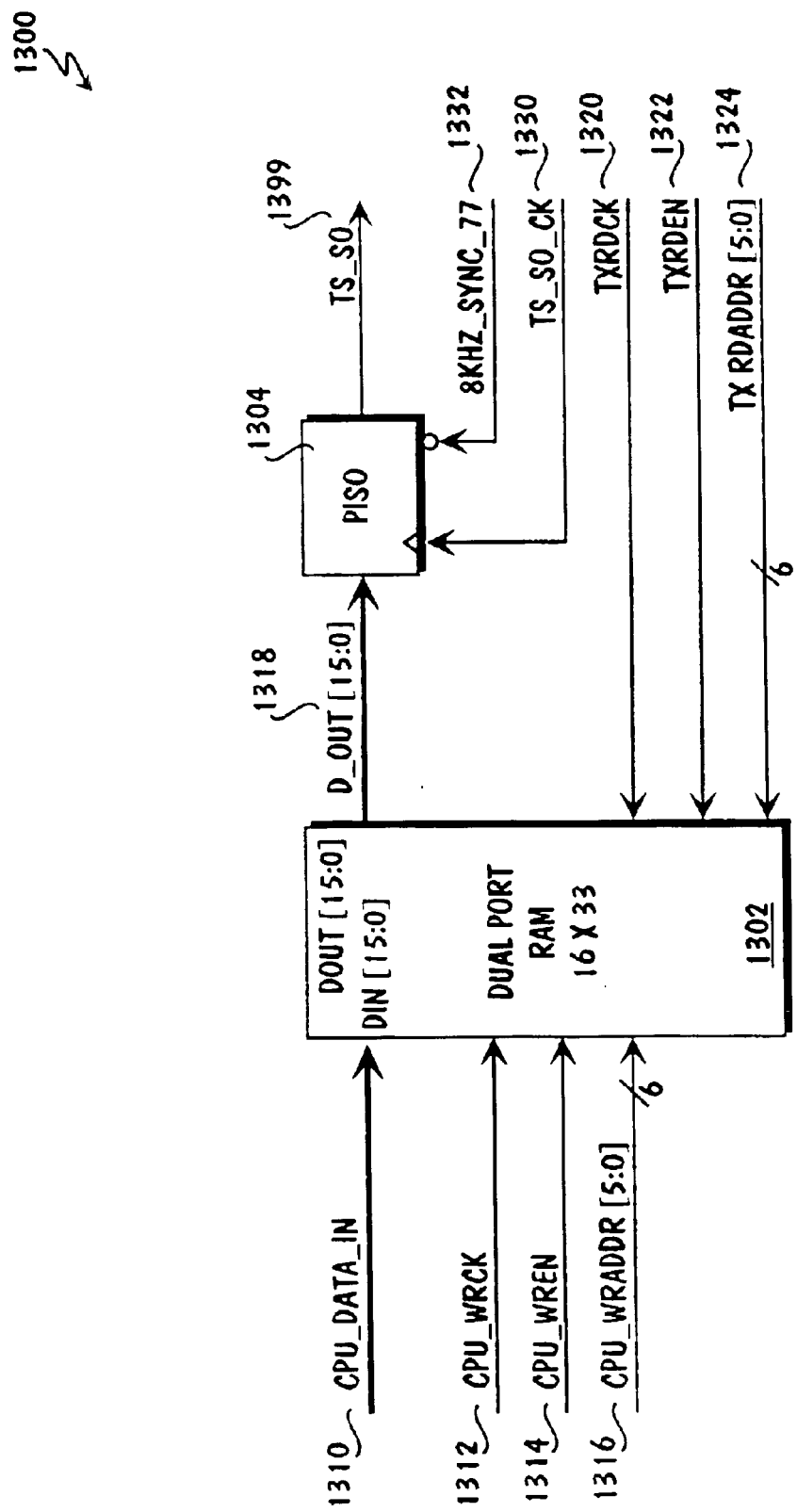
FIG. 13 is an alternate block diagram of TS Net transmitter circuitry of an embodiment.

FIG. 13 is an alternate block diagram of TS Net transmitter circuitry 1300 of an embodiment. Data 1310 is coupled through a dual port random access memory (RAM)

1302 to provide a serial output 1399. The transmitter circuitry 1300, or transmitter, includes at least one dual port 16×33 RAM 1302 and at least one 16-bit serializer 1304, or parallel-in-serial-out (PISO) converter. The transmitter 1300 is coupled among a TMO switch processor or microprocessor or CPU and the TS Net. The transmit RAM 1302 receives data from the CPU (cpu_data_in) 1310 along with signals including a CPU write clock signal (cpu_wrck) 1312, a CPU write enable signal (cpu_wren) 1314, and address signals (cpu_wraddr [5:0]) 1316. The RAM 1302 further receives signals from the TS Net including a transmit read clock signal (txrdck) 1320, a transmit read enable signal (txrden) 1322, and address signals (txrdaddr [5:0]) 1324.

In response to data received from the CPU, the transmit RAM 1302 provides 16 parallel unit data signals (d_out [15:0]) 1318 to the serializer 1304. The serializer 1304 also receives a transmit clock signal (ts_so_ck) 1330 and an 8 kHz clock signal 1332 from the TS Net. The serializer 1304 outputs TS Net data frame signals (ts_so) 1399 to the TS net backplane.

Figure 14:
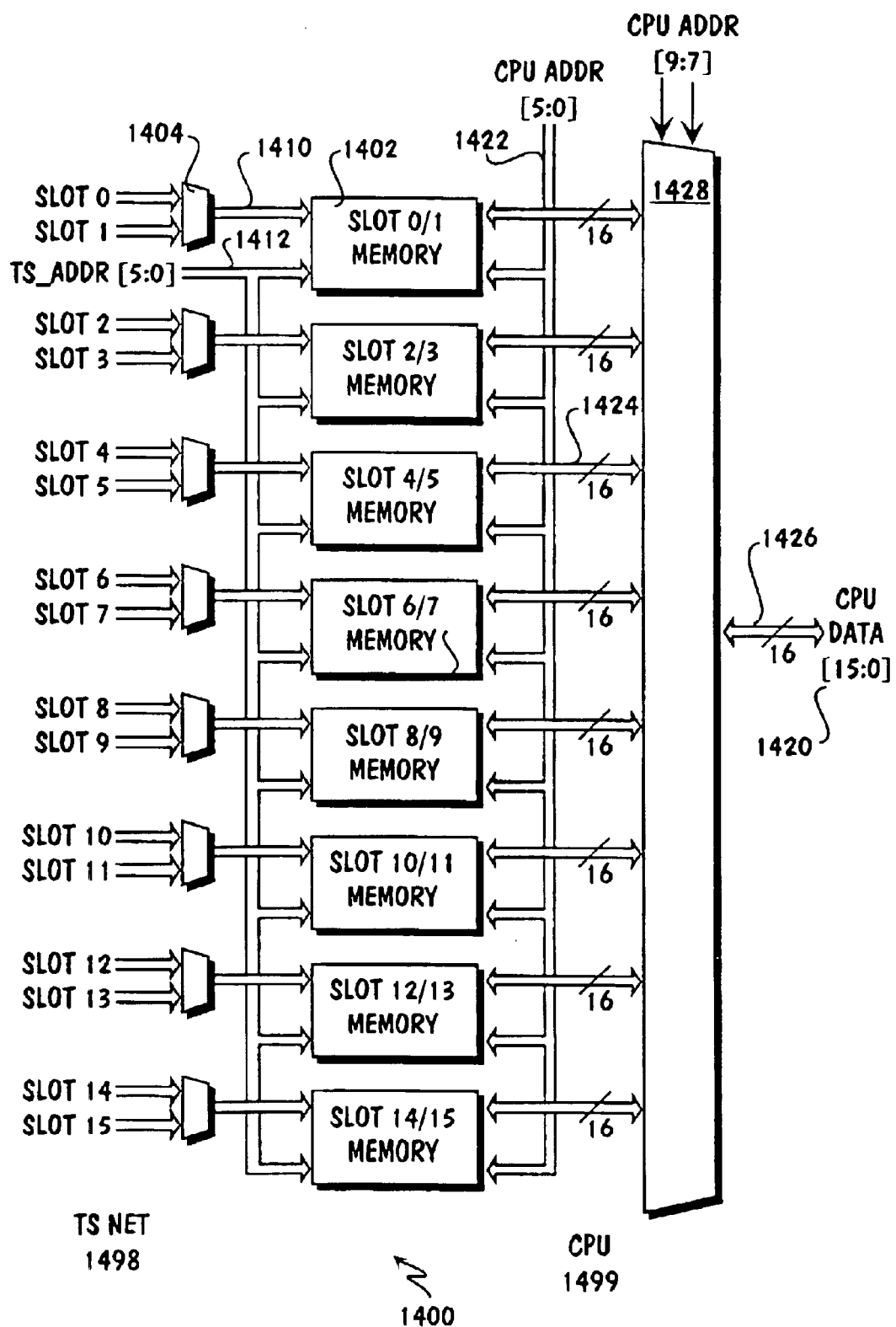
FIG. 14 is a block diagram of a dual port random access memory (RAM) of an embodiment.

FIG. 14 is a block diagram of a dual port random access memory (RAM) 1400 of an embodiment. The RAM 1400 comprises at least 8 memory areas or partitions 1402 that can be accessed by the TS Net 1498 or the CPU 1499. When accessed by the TS Net 1498, data 1410 from two TMO switch cards or slots 0–15 are multiplexed and stored in each memory area or partition 1402 using address signals 1412 provided by the TS Net. For example, data frames from slot 0/card 0 and data frames from slot 1/card 1 are multiplexed 1404 and stored in the same area 1402 of the memory. When accessed by the CPU 1499, data 1420 can be written to or read from the memory areas 1402 using CPU address signals 1422, data buses 1424 and 1426, and multiplexer/demultiplexer 1428.

Figure 15:
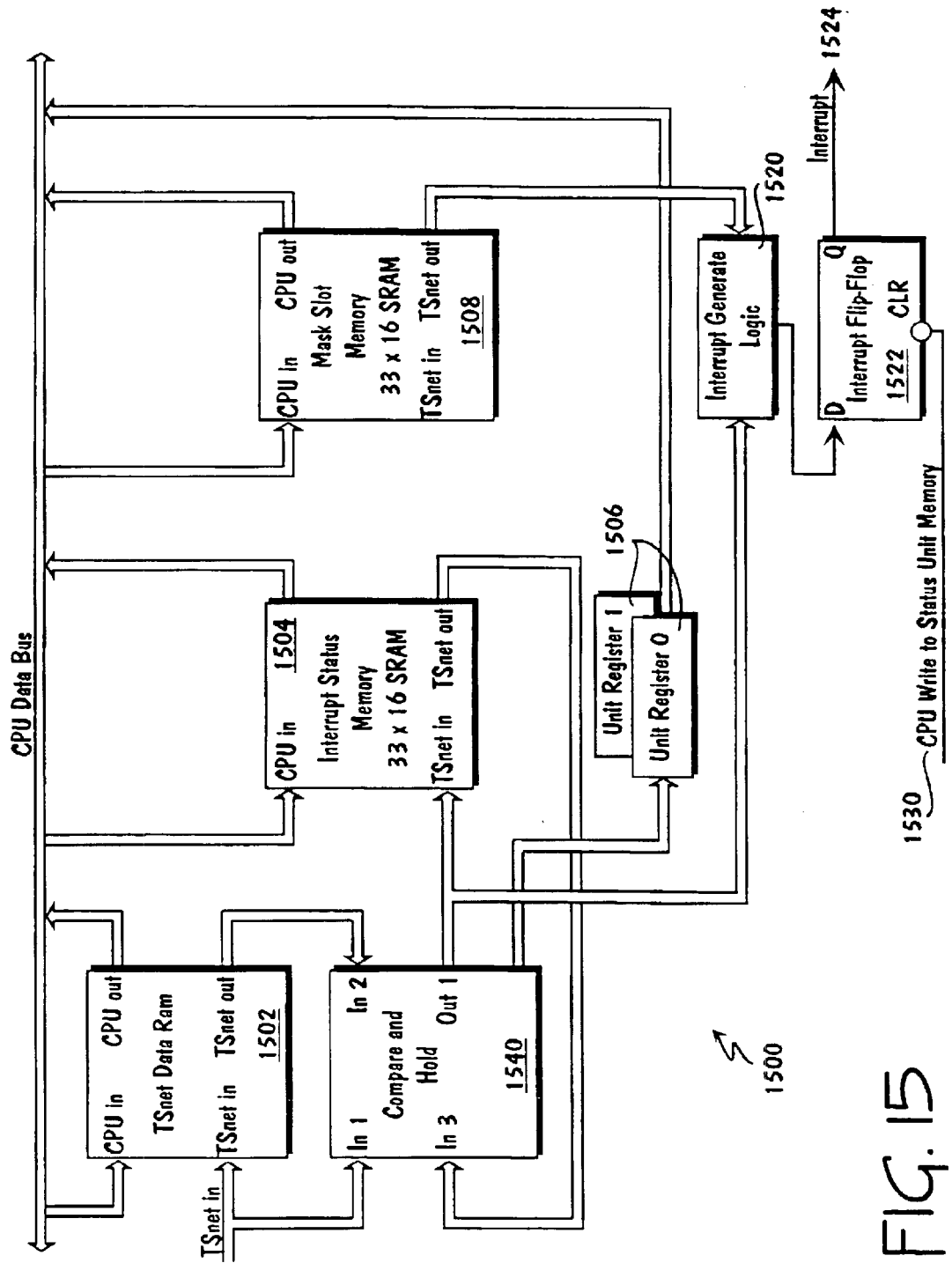
FIG. 15 is a block diagram of TS Net memory circuitry-of an embodiment.

FIG. 15 is a block diagram of TS Net memory circuitry 1500 of an embodiment. The interrupt memory circuitry 1500 of an embodiment is implemented in RAM, but is not so limited. A RAM implementation of interrupt differs from a register implementation in that when using registers the output of the interrupt source bit and the mask bits are active continuously. In the RAM implementation the output of the mask bit and the interrupt sources is inactive as long as the data is stored in memory, and only becomes active when it is read from RAM.

The TS Net memory circuitry 1500 receives and stores data frames comprising 33 serial units from at least 16 independent inputs, where each data frame unit comprises 16 bits. As such, the TS Net receives and stores 8448 sources of interrupt, or interrupt bits, at a frequency of 8 kHz, but is not so limited. The interrupt logic is based upon a detected change of any one of these bits. Using three-level data storage and mapping, the TS Net efficiently manages the detection of bit changes indicating switching events.

The data manipulation begins with the storage of received data and generated interrupt data in a portion of the memory circuitry. The memory circuitry 1500 of an embodiment comprises a TS Net data RAM 1502, an interrupt status memory 1504, unit registers 1506, and a mask slot memory 1508, but is not so limited. The TS Net data RAM 1502 stores interrupt data relating to every detected switching event of the switch cards of a TMO switch. The interrupt status memory 1504 stores interrupt map data, and the unit registers 1506 store unit interrupt data. The TS Net data RAM 1502, interrupt status memory 1504, unit registers 1506, and mask slot memory 1508 can be located on any switch card or in a separate memory device or devices. Furthermore, these memory partitions can each be separate memory devices or, alternatively, be any number of partitioned areas in one or any combination of memory devices. All data received from the TS Net is stored in a data memory of the TS Net data RAM 1502.

Interrupt data is mapped from the TS Net data RAM 1502 to generate an interrupt map in the interrupt status memory 1504. The interrupt status memory 1504 is partitioned, wherein the 16 columns of the memory correspond to network elements or cards and the 33 rows of the memory correspond to the 32 data units and data frame status information.

Interrupt data is further mapped among the interrupt status memory 1504 and the unit registers 1506 comprising Unit Register 0 and Unit Register 1. Each unit register 0 and 1 comprises 16 bits for a total of 32 bits corresponding to each of the 32 units of data. Therefore, the bits of Unit Register 0 correspond to data units 1 through 16 and the bits of Unit Register 1 correspond to data units 17 through 32 of the interrupt map. As discussed herein, unit interrupt bits are written to the corresponding unit register when a receiver compare operation results in any inequality among a newly received unit bit and a stored unit bit of a net data frame. Thus, the unit registers 1506 are memory resident registers which point to the interrupt status memory location where an interrupt pending word is available.

The operation of storing the data in an embodiment is actually a Read/Modify/Write operation, such that the data read is compared with the data being written to the RAM. If any bit is different in any unit then the corresponding bit is set in the status slot interrupt memory which indicates the input line in which the interrupt occurred. For example, if line #2 has a difference between the data in a new frame and data in an old frame, then bit #2 of the status-word is set. In addition, the event of the interrupt is reported to the interrupt generate logic 1520 and to Unit Register 0 and Unit Register 1. The interrupt generate logic 1520 reads the mask status of the interrupt bit. If this bit is set, an interrupt flip flop 1522 is set, which is a continuous active signal coupled to the processor interrupt line 1524.

Upon servicing an interrupt, the interrupt 1524 is cleared by writing a logic 1 over the corresponding set interrupt bit in the interrupt status memory 1504. Writing over the set interrupt bit clears the interrupt as detected by the interrupt generate logic 1520. Further, the processor write signal 1530 to the interrupt status memory 1504 clears the interrupt signal from the interrupt flip-flop 1522.

The TS Net circuitry further includes compare and hold circuitry 1540, as discussed herein, but is not so limited. The compare and hold circuitry 1540 can be used to reduce interrupt generation errors by holding interrupt data for a prespecified number of clock cycles prior to performing a comparison. This filtering logic allows for any number of evaluations of the data prior to changing the contents of the memory, so that a data change could be required to be maintained for prespecified number of clock cycles prior to initiating a memory write.

Figure 16:
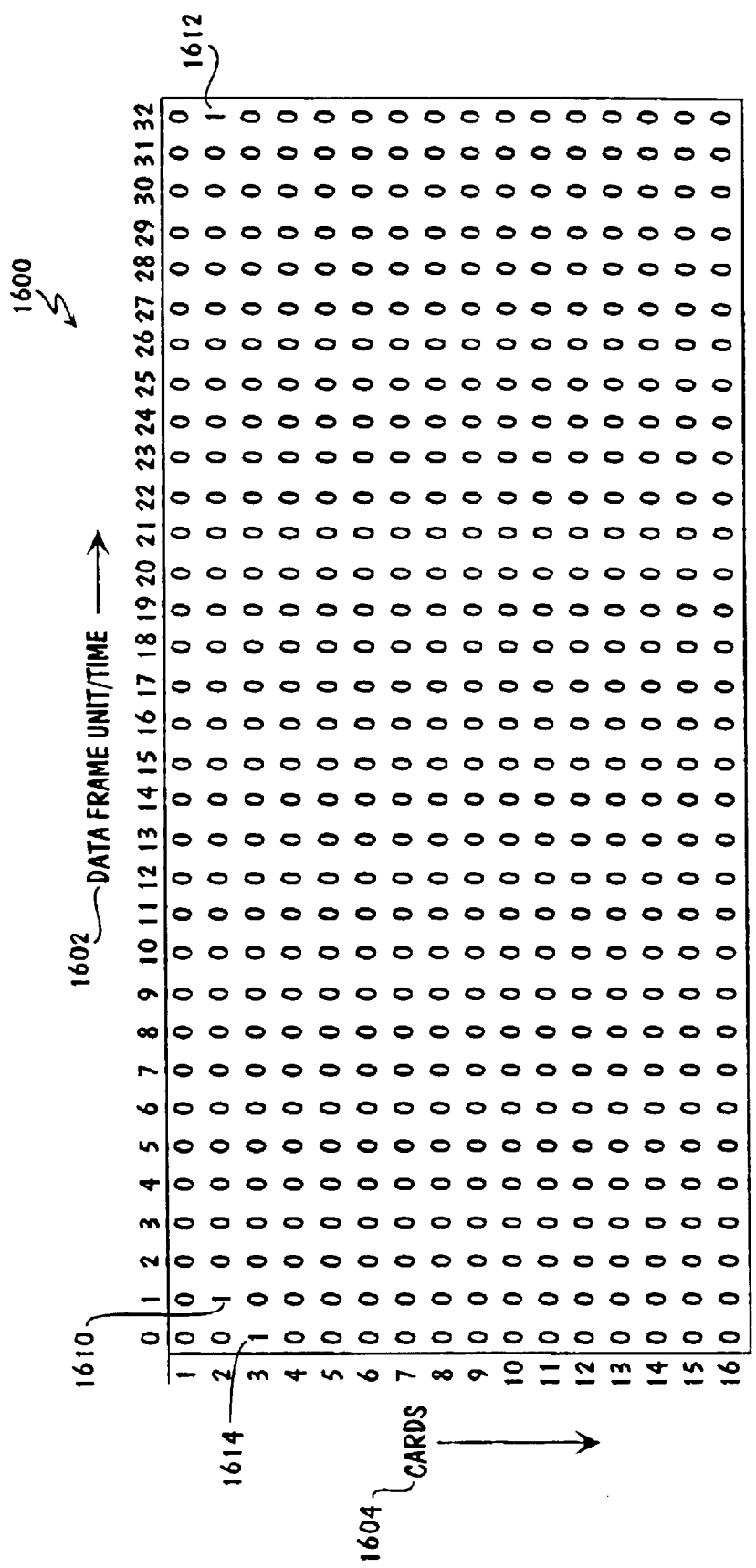
FIG. 16 shows a TS Net data RAM of an embodiment.

FIG. 16 shows a TS Net data RAM 1600 of an embodiment. The TS Net data RAM 1600 is partitioned so that the memory columns correspond to data frame unit/time 1602 and the rows correspond to cards 1604, but is not so limited. This memory example shows three switching event interrupts, including an interrupt at frame unit 1 of card 2 1610, another interrupt at frame unit 32 of card 2 1612, and an interrupt at frame unit 0 of card 3 1614.

In using the multi-level interrupt mapping of an embodiment, an interrupt service routine of an embodiment begins with the processor reading Unit Register 0 and Unit Register 1 sequentially until a set unit interrupt bit is encountered. The location of the unit interrupt bit in the unit register notifies the processor of the unit in need of servicing. In response to the unit interrupt bit the processor is directed to the address in the interrupt status memory 1504 that corresponds to the set interrupt bit.

Upon reading the data at the appropriate address of the interrupt status memory 1504, the processor determines the particular switch card from which the unit interrupt originated. Upon determining the unit and switch card from which the switching event was reported, the processor proceeds to the appropriate memory area or partition of the TS Net data RAM 1502 to read detailed K1/K2 information regarding the reported switching event. Using the detailed switching event information, the processor services the detected interrupt.

The memory mapping of the TS Net of an embodiment provides for an efficient determination of switching event locations by allowing the processor to first read the unit registers to determine in which data unit a switching event has occurred. From the unit registers the processor is directed to the portion of the interrupt map corresponding to that data unit to determine which system or switch boards generated switching events. The interrupt status memory points to the portion of data memory where the interrupt bit resides so that, from the interrupt map, the processor is directed to the areas of the data memory corresponding to the switching event information for detailed data regarding the switching event. In this manner, switching event information is more quickly determined in contrast to having the processor read the entire contents of the data memory in a search for switching event bit change indications.

Figure 17:
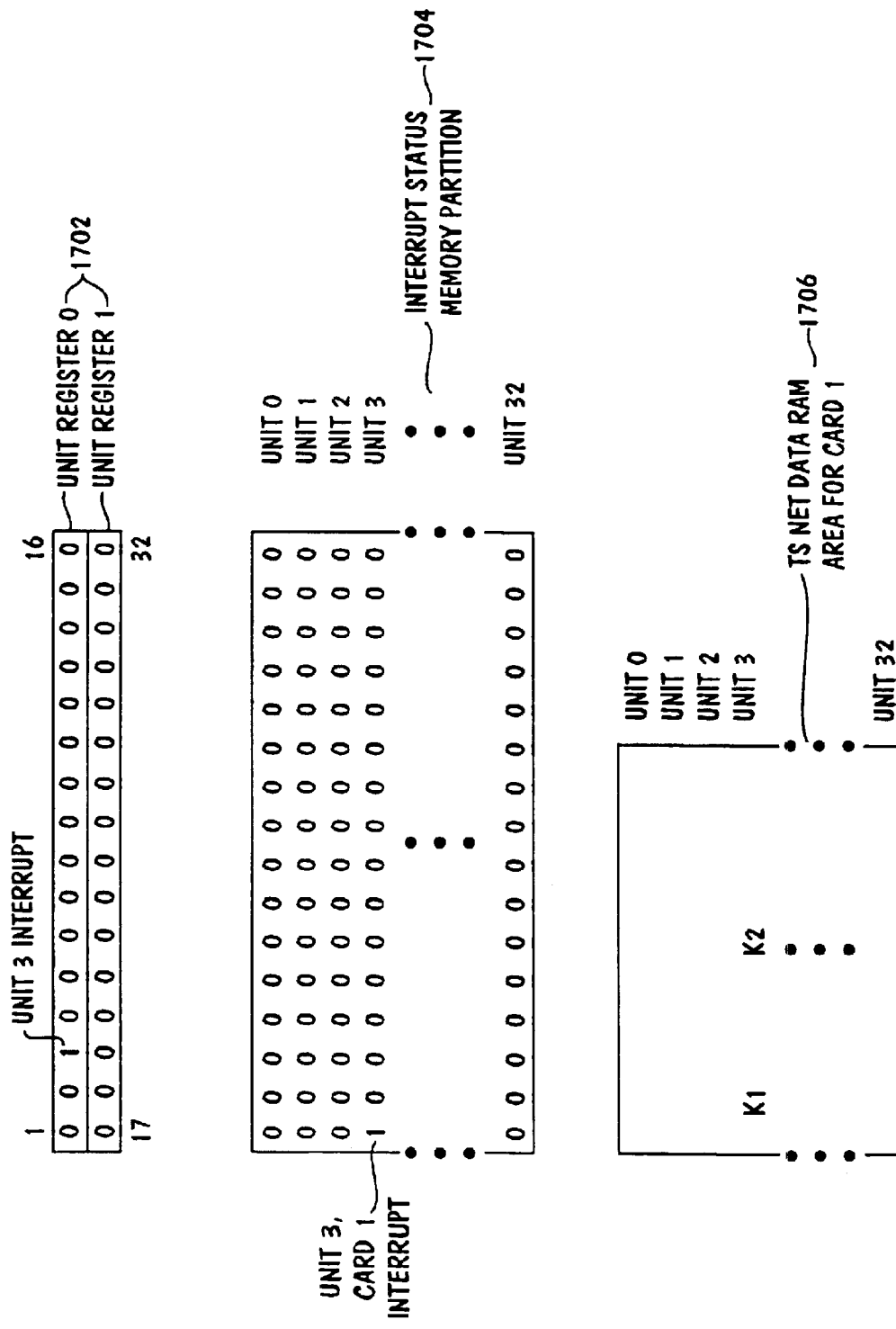
FIG. 17 shows an example of multiple level memory mapping in TS Net memory circuitry of an embodiment.

FIG. 17 shows an example of multiple level memory mapping in TS Net memory circuitry of an embodiment. In this example, a CPU first receives a massive interrupt signal from the massive interrupt circuitry indicating that a switching event has been reported by a switch card of the TMO switch. The CPU proceeds to the area of the associated FPGA containing the unit registers 1702. The FPGA can be located on a particular card of the TMO switch or can be distributed among a number of cards of the TMO switch. In an embodiment, the FPGA is located on a cross-connect card coupled to the CCC hosting the CPU, but is not so limited.

The CPU reads the unit registers 1702 until the unit generating the interrupt is encountered. In this example, unit 3 is the source of the interrupt. In response to the unit 3 interrupt bit, the CPU is directed to the portion of the interrupt status memory 1704 corresponding to unit 3. Upon reading the appropriate portion of the interrupt status memory 1704, the CPU determines the particular switch card or board from which the unit interrupt originated, card 1 in this example.

Upon determining that the switching event was reported by unit 3 of switch card 1, the CPU of this example proceeds to the memory area or partition of TS Net data RAM 1706 corresponding to card 1 where it reads detailed K1/K2 information regarding the reported switching event. Using the detailed switching event information, the CPU services and clears the detected interrupt.

The TS Net is coupled to receive data from and provide data to SONET channels. The data received from the SONET channels is placed in TS Net data frames for transfer through the TS Net. The net data frames are generated from SONET data received at each port of a system card. The TS Net of an embodiment interfaces with SONET channels using trunk cards. The trunk cards include an application specific integrated circuit (ASIC) that provides at least three signals to TS Net data frame generation circuitry. The three signals include, but are not limited to, a clock signal, a frame position (FP) signal, and data signals.

Figure 18:
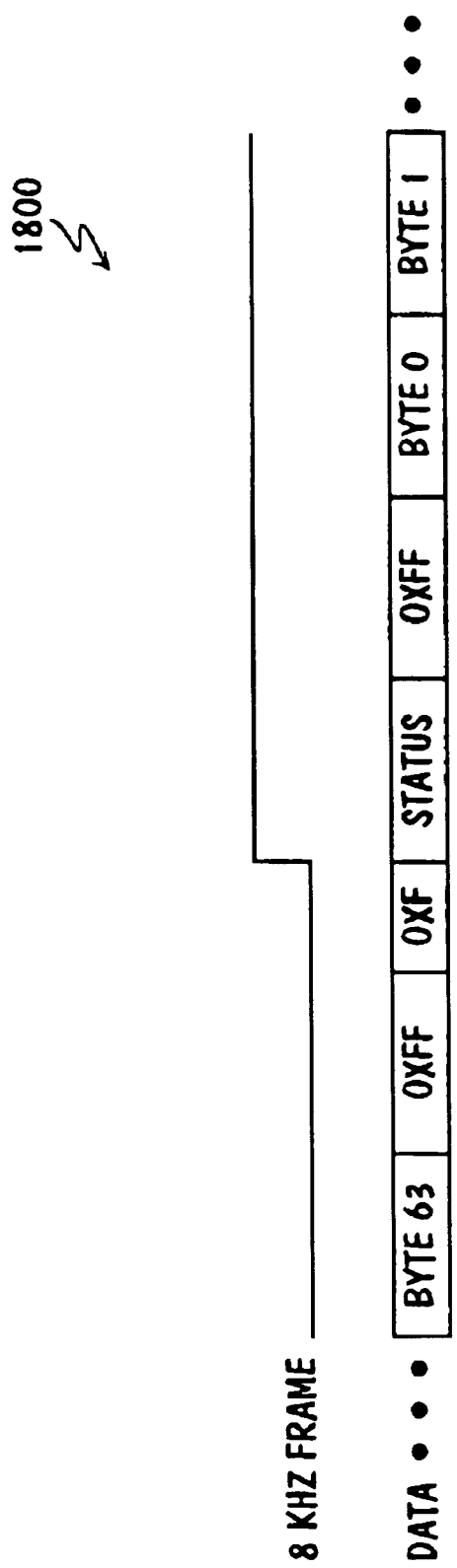
FIG. 18 is a TS Net data frame format of an embodiment.

The net data frame of an embodiment comprises 67.5 bytes transmitted at a frequency of 4.32 MHz as a serial bit stream. FIG. 18 is a TS Net data frame format 1800 of an embodiment. The net data frame 1800 includes 64 payload bytes, two status bytes, and 1.5 unused bytes, but is not so limited. The 64 payload bytes are divided into 32 units, wherein each unit includes 2 bytes. The 2 bytes comprise the K1 and K2 bytes used by the SONET network to carry switching event information among the network components. The format of the payload bytes is dependent on the source card and will generally be determined by software.

The net data frame transfer rate is asynchronous with the data transfer rate of the SONET network. The net data frame is aligned to the rising edge of the 8 kHz reference provided as the timing source for the card. The bytes are transmitted most significant bit (MSB) to least significant bit (LSB). Unused bits are ignored by the receiver.

The net data frame status bytes contain the status of each card in the TMO switch. FIG. 19 shows status bit combinations of a status byte and associated interpretations of an embodiment. The status byte provides the status for all TMO switch cards upon power up. This information allows the CCC to designate particular cards as active and standby cards. This status scales to different ports on each board. It is noted that if a slot does not contain a card, the TS Net signal corresponding to that slot is pulled high and the status bits will report not present. When a card fails, or is first installed in a slot, the corresponding TS Net signal is pulled low and the status bits will report Present and Failed. If a card without intelligence is used, it should pull the corresponding TS Net signal low to notify the PC card that a card is installed and provide a means for the main processor to determine what type of card is inserted.

Figure 20:
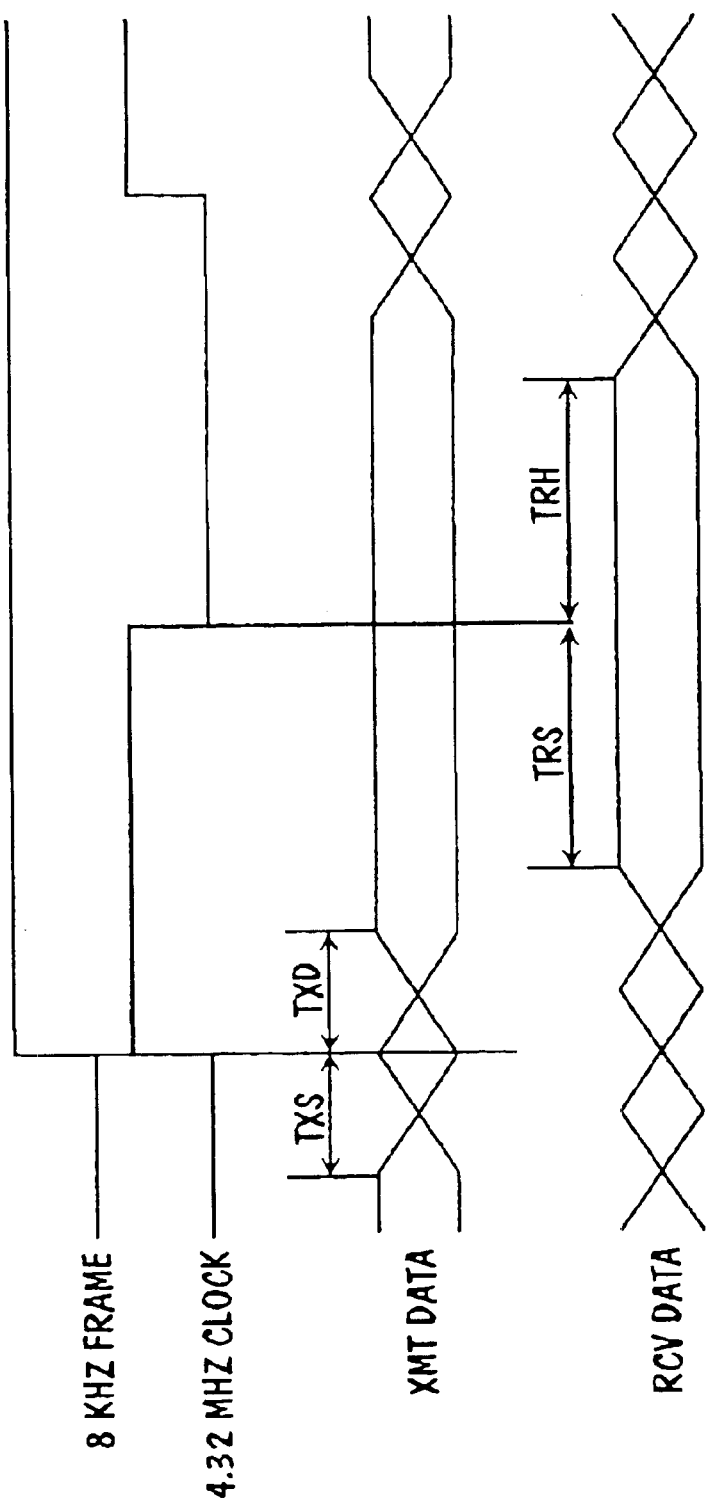
FIG. 20 shows a TS Net timing diagram of an embodiment.

FIG. 20 shows a TS Net timing diagram of an embodiment. FIG. 21 shows TS Net timing parameters of an embodiment. The TS Net operates at a 4.32 MHz bit rate synchronized to the 8 kHz clock received from the active CCC. Software selects the 8 kHz clock received from the active CCC, but the embodiment is not so limited. Timing parameters are defined relative to the 4.32 MHz clock, wherein the clock is generated from a 77.76 MHz reference clock derived by the cards from the selected 8 kHz clock.

Data is transmitted among TS Net elements on the rising edge of the 4.32 MHz clock and received by TS Net elements on the falling edge of the 4.32 MHz clock. The transmit and receive parameters are chosen to allow for up to approximately 60 nanoseconds of skew or uncertainty on the 8 kHz clocks received by each card and variations in timing delays on the backplane. A number of internal control signals are used to accommodate this difference so as to ensure all data is captured, but the embodiment is not so limited.

Non-optical interface cards or boards (e.g., DS1 and DS3), upon interfacing with the TS Net of an embodiment, comply with a number of network conditions. The conditions for non-optical cards that include a local processor include, but are not limited to: the board status bits are cleared to zero upon power up, reset, watchdog timeout, or hardware detected failure; the local processor has read/write access to the board status bits; the hardware transmits the board status bits in accordance with the TS Net frame format and timing; the hardware receives the board status bits from each of the 16 TS Net signals and stores them in a processor accessible register; the hardware detects any changes in any received board status bits and sets a bit in a 16 bit interrupt status register corresponding to the TS Net signal where the change occurred; the hardware provides a 16-bit mask register to mask any of the interrupt status bits; and the hardware generates an interrupt when any unmasked interrupt status bits is set. The only condition relating to non-optical cards without a local processor is that they drive their output signal low at all times.

Optical cards use the TS Network to send and receive K1/K2, E1, and F1 bytes. In addition, an interface allows the processor on the optical card to define any of the 64 payload bytes. This capability can be used by software to send events and status to the PC card processor with minimum latency.

FIG. 22 is a TS Net data frame payload byte assignment of an embodiment. The payload byte assignment specifies the payload bytes for optical cards having up to 16 ports, but is not so limited. Bytes 32 to 63 are not defined and can be used by the processor on the optical card to send status and event information to the CCC processor.

As optical cards use the TS Net to transmit and receive K1/K2, E1, and F1 bytes, system configuration allows for selection of the source of transmitted data. For each K1/K2 byte pair, the source of data transmitted on the TS Net is selected as either a processor register or the validated K1 K2 bytes received on the corresponding optical input port for each K1/K2 byte pair. The K1/K2 byte pairs are treated as a single entity so that the K1/K2 bytes received on one SONET frame are transmitted in a single TS Net data frame.

For each E1 byte, the source of data transmitted on the TS Net is selected as a processor register, the E1 byte received on the optical port, or the E1 byte received on the front panel connector. For each F1 byte, the source of data transmitted on the TS Net is selected as a processor register, the F1 byte received on the optical port, or the F1 byte received on the front panel connector.

The optical cards of an embodiment receive TS Net signals both from other optical cards and from one of the CCCs. A determination is made as to which of the 16 received TS Net signals is originating from the mate of the receiving optical card. Further, a determination is made as to which of the two TS Net signals received from the CCCs is to be processed.

The K1/K2 bytes sent on each optical port can come from the corresponding port on the mate optical card or from the active CCC. If software selects K1/K2 bytes from the mate optical card then the bytes from the corresponding port are used. Alternatively, any of the 32 byte pairs received from the active CCC can be selected for transmission on the optical port. The local processor should also be allowed to define the K1/K2 byte pair to send. If this feature is not already provided by the interface chip that provides the SONET signal, it is added to the TS Net hardware. The K1/K2 byte pair is treated as a single entity so that the K1/K2 bytes received on one net data frame are transmitted in a single SONET frame.

For each E1 byte, the source of data transmitted on the optical port is selected as the E1 byte received from the corresponding port on the mate optical port, or the E1 byte received on a front panel connector of the TMO switch. Multi-port optical cards might not have an order wire connector or might share a single connector among all optical ports.

For each F1 byte, the source of data transmitted on the optical port is selected as the F1 byte received from the corresponding port on the mate optical port, or the F1 byte received on a front panel connector of the TMO switch. Multi-port optical cards might not have a user channel connector or might share a single port among all optical ports.

Figure 23:
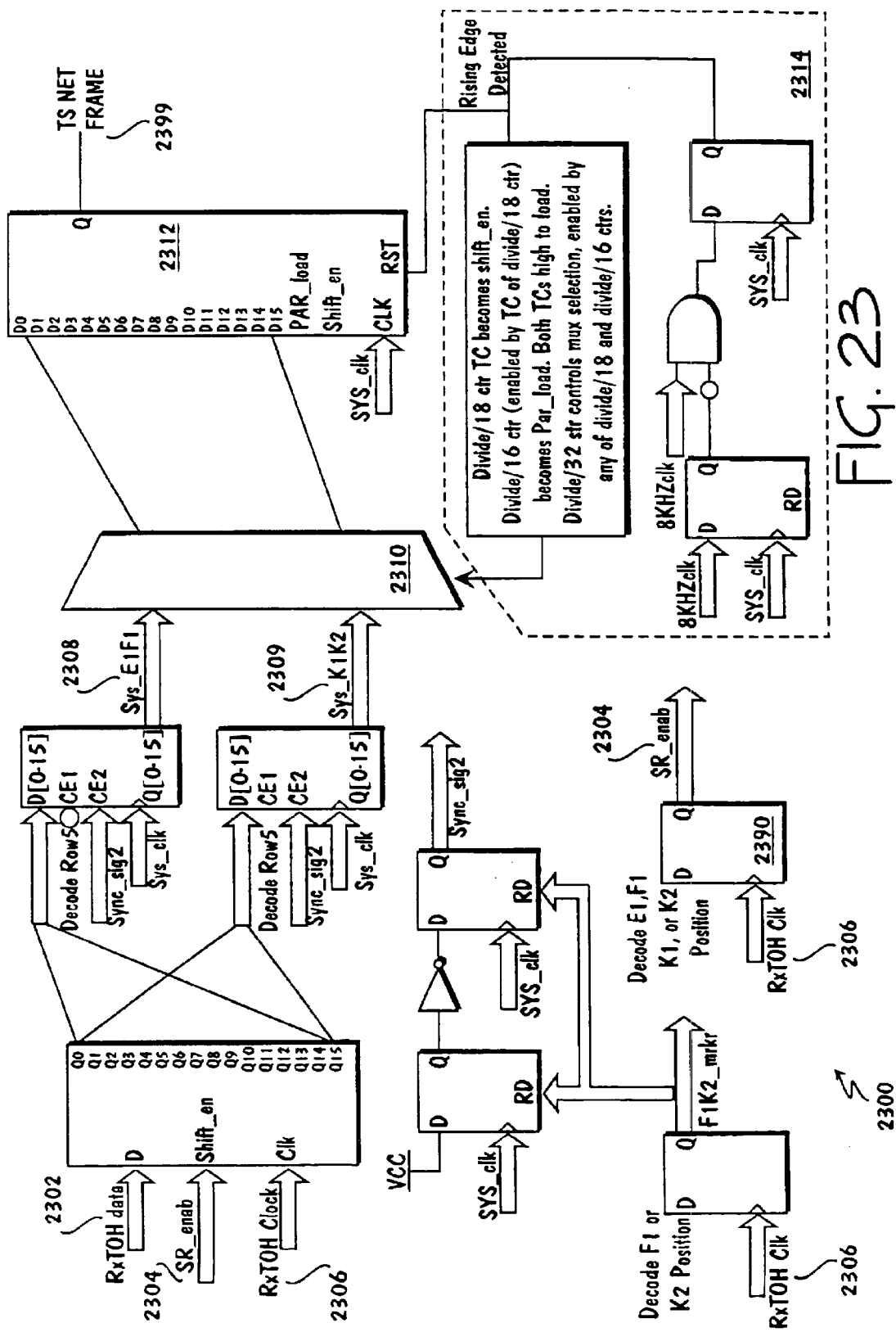
FIG. 23 is a block diagram of net data frame generation circuitry of an embodiment.

FIG. 23 is a block diagram of net data frame generation circuitry 2300 of an embodiment. The net data frame generation circuitry 2300 is coupled to receive inputs including SONET data 2302, shift register enable signals 2304, and clock signals 2306. The net data frame generation circuitry 2300 functions to count through the SONET data frames 2302 and latch the appropriate data frames from the SONET data 2302 to provide a TS Net data frame 2399 output.

Figure 24:
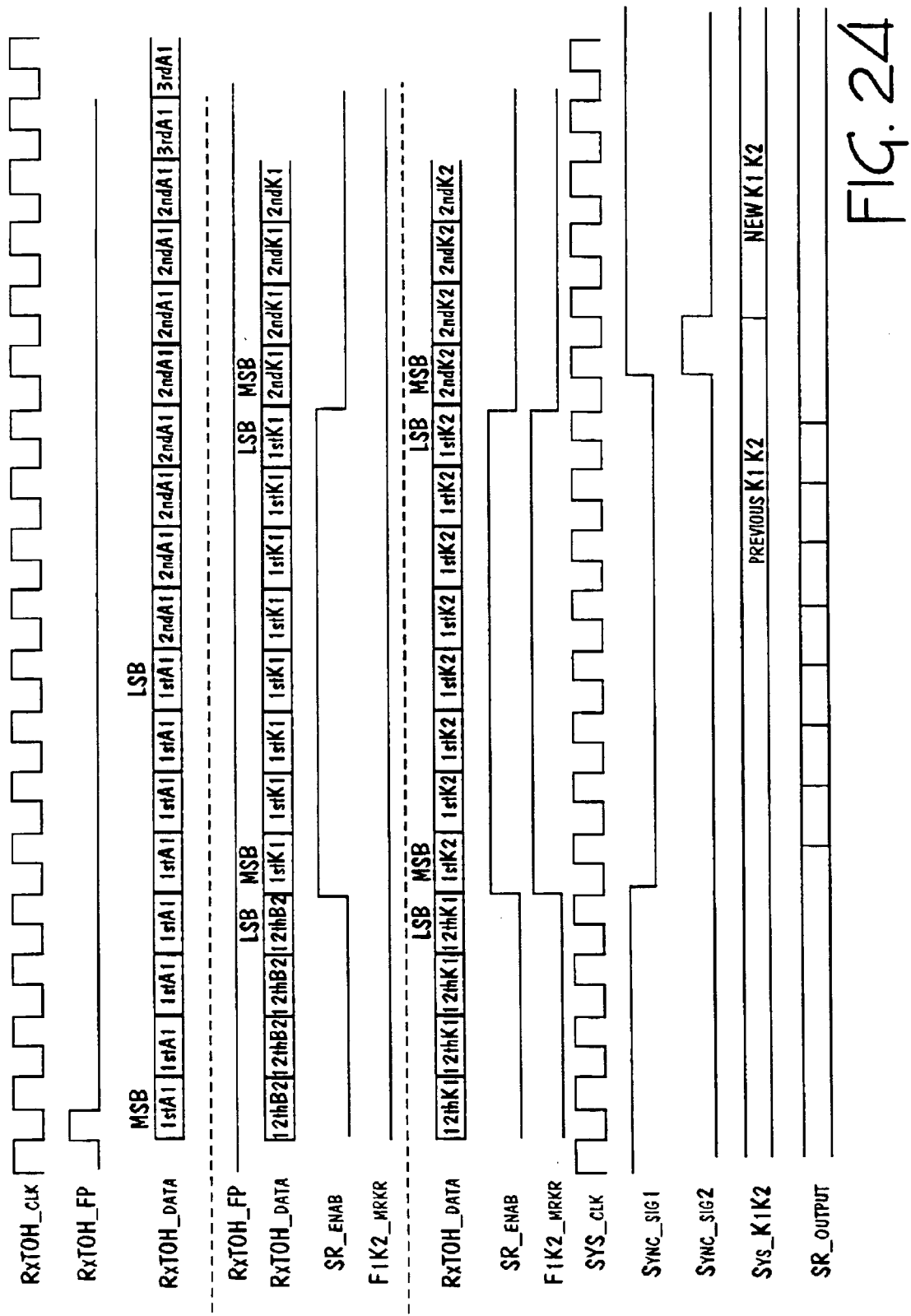
FIG. 24 is a timing diagram for capture of SONET K1/K2 bytes in an embodiment.

The RxTOH Data signal 2302 includes the SONET data from a SONET interface, which in an embodiment is an application specific integrated circuit (ASIC). The RxTOH Clock signal 2306 is a 20.736 MHz clock received from the SONET interface. The shift register enable signal (SR_enab) 2304 is received from shift register enable circuitry that includes at least one flip flop 2390 coupled to RxTOH clock signal 2306. FIG. 24 is a timing diagram for capture of SONET K1/K2 bytes in an embodiment.

Figure 25:
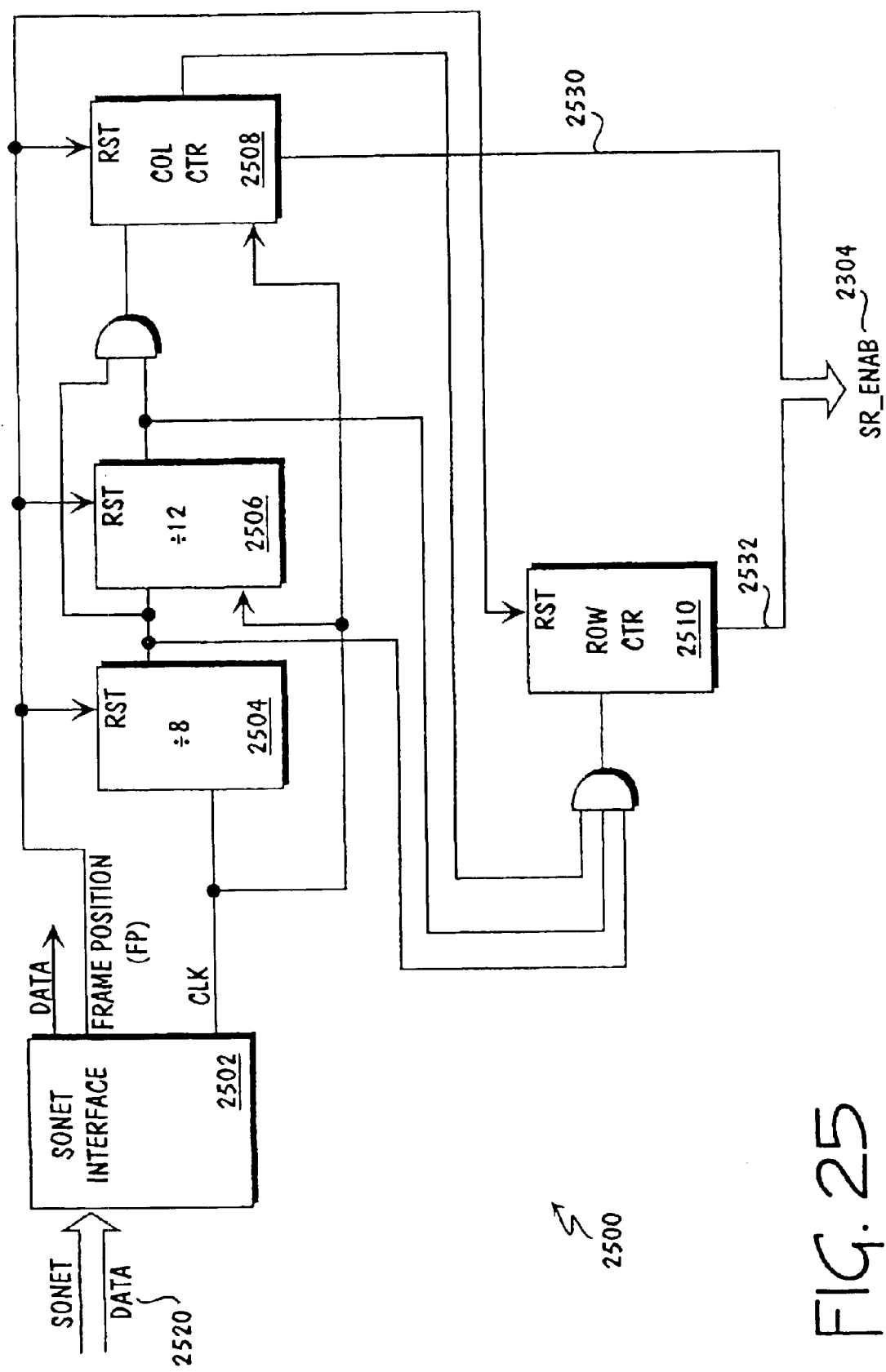
FIG. 25 is a block diagram of shift register enable circuitry of an embodiment.

FIG. 25 is a block diagram of shift register enable circuitry 2500 of an embodiment. The shift register enable circuitry 2500 couples SONET data 2520 through an interface 2502 to circuitry comprising a divide-by-8 byte counter 2504, a divide-by-12 byte counter 2506, a column counter 2508, and a row counter 2510, but is not so limited. The shift register enable circuitry 2500 generates an output signal (sr_enab) 2304 that includes the outputs of the column counter 2530 and the row counter 2532, wherein the output signal 2304 locates and latches the E1, F1, K1, and K2 bytes from the received SONET data frames 2302.

The latched E1 and F1 bytes 2308 as well as the latched K1 and K2 bytes 2309 are coupled through a multiplexer 2310 to a parallel-to-serial interface 2312 with the TS Net. The multiplexer 2310 is further coupled to control circuitry 2314 including a series of counters that identify word boundaries and count the corresponding words. The multiplexer control circuitry 2314 is controlled using case statements, but is not so limited.

Figure 26:
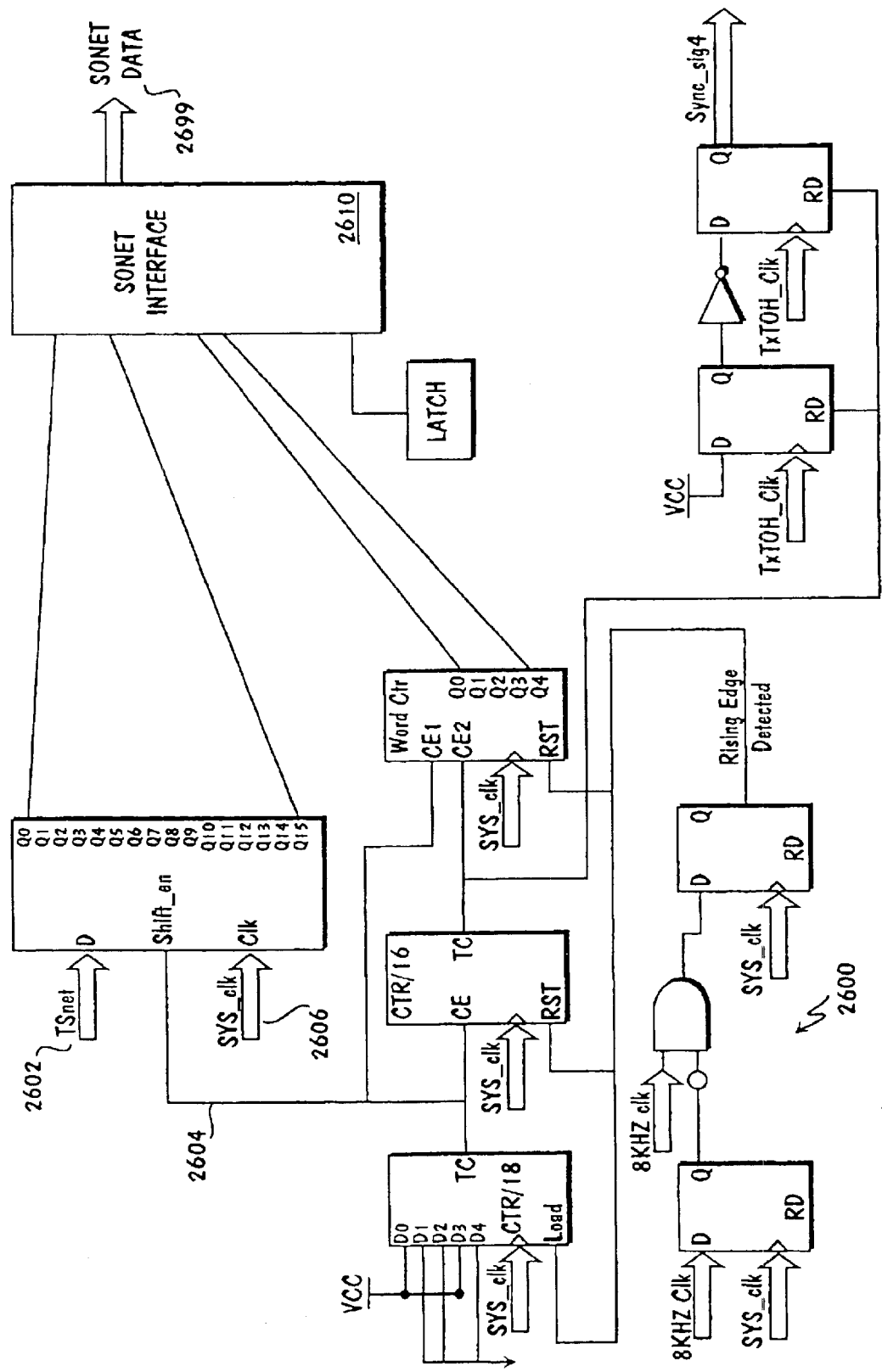
FIG. 26 is a block diagram of TS Net data frame capture circuitry of an embodiment.

The TS Net is coupled to provide data to SONET channels or ports using TS Net frame capture circuitry. FIG. 26 is a block diagram of TS Net data frame capture circuitry 2600 of an embodiment. This capture circuitry 2600 is coupled to receive TS Net data frames 2602, shift enable signals (shift_en) 2604, and clock signals 2606. The capture circuitry 2600 latches the data corresponding to the associated SONET port from the TS Net data frame 2602 and provides the latched data to the SONET network or ring 2699 via the SONET interface 2610.

Figure 27:
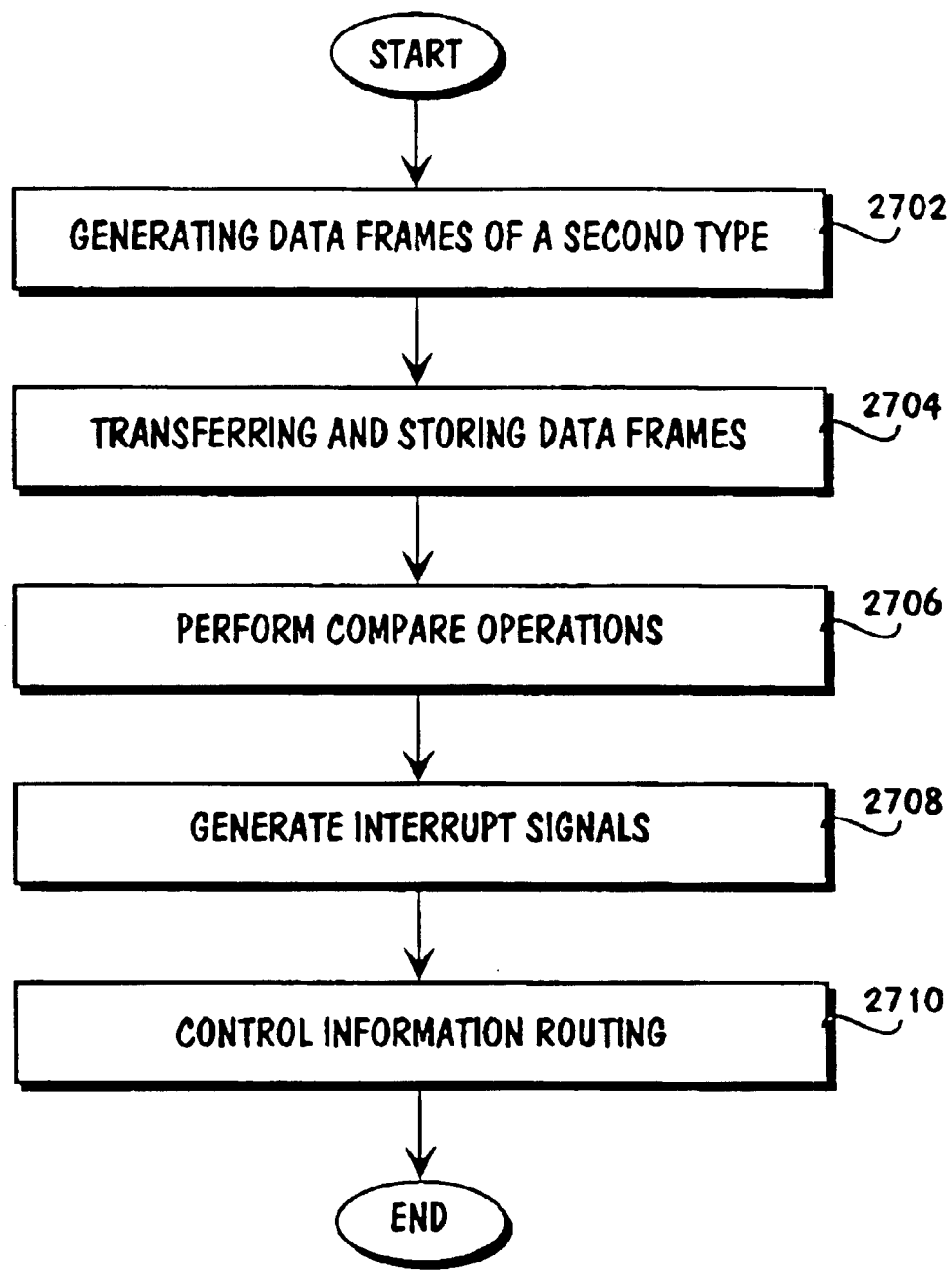
FIG. 27 is a flow diagram for routing network switching information of an embodiment.

FIG. 27 is a flow diagram for routing network switching information of an embodiment. Operation begins with the generation of at least one data frame of a second type, or TS Net data frame, from at least one data frame of a first type 2702. The TS Net data frame comprises switching event information. The TS Net data frame can be transferred and stored among a plurality of network elements using a second network, or backplane network 2704. Compare operations are performed among prespecified data frames of the TS Net data frame 2706. At least one interrupt signal is generated in response to at least one detected change resulting from the compare operations 2708. Information routing is controlled in at least one network in response to the interrupt signals 2710.

Figure 28:
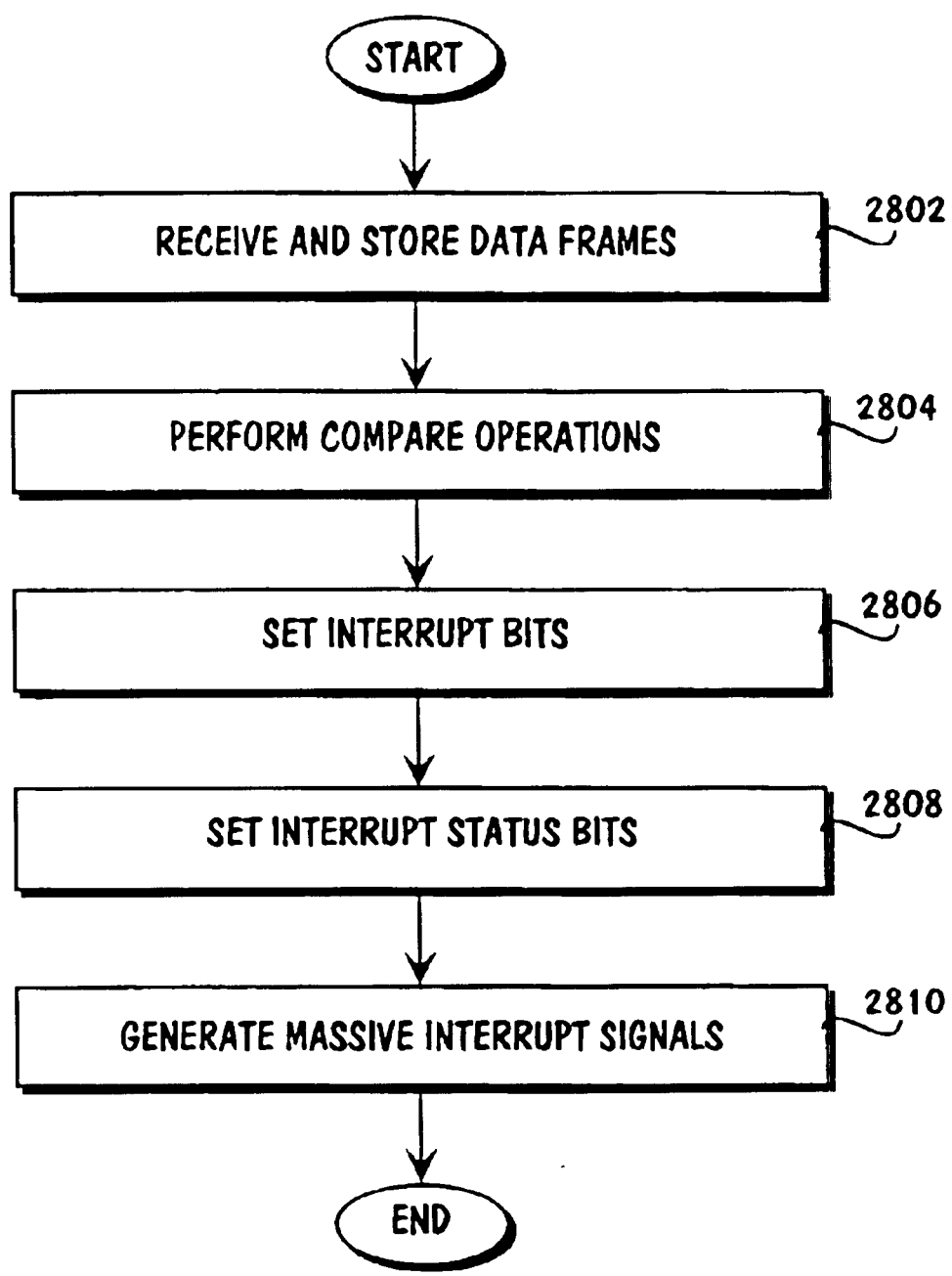
FIG. 28 is a flow diagram for generating massive interrupts in random access memory (RAM) of an embodiment.

FIG. 28 is a flow diagram for generating massive interrupts in random access memory (RAM) of an embodiment.

A number of data frames comprising switching event information are received and stored in a first RAM area 2802. Compare operations are performed among prespecified ones of the data frames 2804. Unit interrupt bits are set in a corresponding location of a second RAM area in response to at least one detected bit difference resulting from the compare operations 2806. Interrupt status bits are set in a corresponding location of a third RAM area in response to a set unit interrupt bit 2808. A massive interrupt signal is generated in response to at least one set unit interrupt bit 2810.

Figure 29:
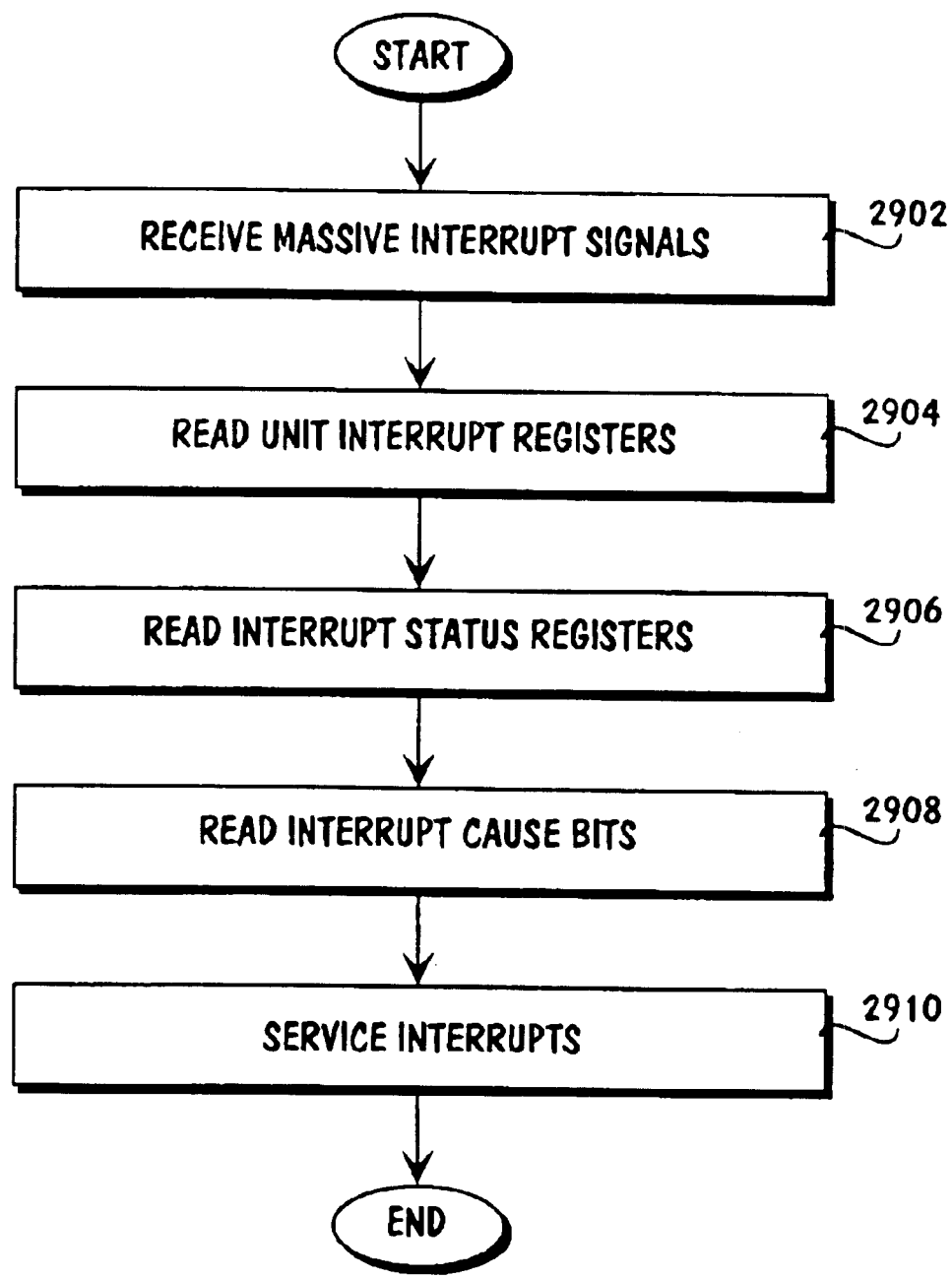
FIG. 29 is a flow diagram for servicing massive interrupts in random access memory (RAM) of an embodiment.

FIG. 29 is a flow diagram for servicing massive interrupts in random access memory (RAM) of an embodiment. In response to receipt of a massive interrupt signal 2902, at least one unit interrupt register is read in a first RAM area 2904. A set unit interrupt bit corresponds to an address in a second RAM area. An interrupt status register is read at the corresponding address in the second RAM area in response to the set unit interrupt bit 2906. A set interrupt status bit corresponds to an address in a third RAM area. The interrupt cause bits are read at the corresponding address in the third RAM area in response to the set interrupt status bit 2908, and detailed information is obtained about the interrupt. The interrupt is serviced 2910 in accordance with the detailed information.

The description herein of various embodiments of the invention has been presented for purpose of illustration and description. It is not intended to limit the invention to the precise forms disclosed. Modifications and equivalent arrangements will be apparent.

What is claimed is:

1. A method for routing network switching information, comprising:

generating at least one data frame of a second type from at least one data frame of a first type, wherein the at least one data frame of a second type comprises switching event information;

transferring and storing the at least one data frame of a second type among a plurality of network elements using a second network;

performing at least one compare operation among prespecified data frames of a second type;

generating at least one interrupt signal in response to at least one detected change resulting from the at least one compare operation;

controlling information routing in at least one network in response to the at least one interrupt signal;

generating at least one unit interrupt signal in response to the at least one detected change;

generating at least one memory map in response to the at least one unit interrupt signal; and generating at least one massive interrupt signal in response to the at least one unit interrupt signal.

2. The method of claim 1, further comprising distributing the at least one memory map among the plurality of network elements.

3. The method of claim 1, wherein the at least one memory map comprises memory maps among three areas of a random access memory.

4. The method of claim 1, further comprising:

navigating among a plurality of memory locations using a plurality of memory maps in response to the at least one interrupt signal;

reading data from the plurality of memory locations relating to the switching event information; and evaluating the switching event information.

5. The method of claim 1, further comprising coupling an output of each of the plurality of network elements to an input of the plurality of network elements.

6. The method of claim 1, wherein the at least one data frame of a first type comprises a synchronous optical network data frame.

7. The method of claim 1, wherein the at least one data frame of a second type comprises 67.5 bytes transferred as a serial bit stream at a rate of 4.32 megahertz.

8. The method of claim 7, wherein at least one data frame of a second type comprises status bytes and Synchronous Optical Network (SONET) bytes including K1, K2, E1, and F1 bytes.

9. The method of claim 1, wherein the second network comprises a 16-channel bus.

10. The method of claim 1, wherein the at least one detected change is an inequality among bits of the at least one data frame of a second type.

11. The method of claim 1, further comprising generating a plurality of control and clock signals.

12. The method of claim 1, wherein the storing comprises multiplexing the at least one data frame of a second type from a plurality of ports into a memory area of a dual port random access memory.

13. The method of claim 1, further comprising receiving the at least one data frame of a first type from a plurality of network ports distributed among a plurality of switch cards.

14. The method of claim 1, further comprising distributing processing of switching event information among the plurality of network elements.

15. A method of communicating among a plurality of network elements, comprising:

capturing at least one network data frame from at least one network;

generating at least one backplane data frame from the at least one network data frame, wherein the at least one backplane data frame comprises switching event information;

transferring and storing the at least one backplane data frame among the plurality of network elements using a backplane network;

performing at least one compare operation among at least one transferred backplane data frame and at least one stored backplane data frame at prespecified intervals;

generating at least one interrupt signal in response to at least one detected change in switching event information resulting from the at least one compare operation; and generating at least one unit interrupt signal in response to the at least one detected change;

generating at least one memory map in response to the at least one unit interrupt signal; and generating at least one massive interrupt signal in response to the at least one unit interrupt signal.

16. The method of claim 15, further comprising distributing the at least one memory map among the plurality of network elements.

17. The method of claim 15, further comprising:

navigating among a plurality of memory locations using a plurality of memory maps in response to the at least one interrupt signal;

reading data from the plurality of memory locations relating to the switching event information; and evaluating the switching event information.

18. The method of claim 15, further comprising coupling an output of each of the plurality of network elements to an input of the plurality of network elements using the backplane network, wherein the backplane network includes at least one 16-channel bus.

19. The method of claim 15, wherein the at least one network data frame comprises a synchronous optical network data frame, wherein the at least one backplane data frame comprises 67.5 bytes transferred as a serial bit stream at a rate of 4.32 megahertz.

20. The method of claim 15, wherein the at least one detected change is an inequality among bits of the at least one network data frame.

21. The method of claim 15, wherein the storing comprises multiplexing the at least one backplane data frame from a plurality of ports into a memory area of a dual port random access memory.

22. The method of claim 15, further comprising receiving the at least one network data frame from a plurality of network ports distributed among a plurality of switch cards.

23. The method of claim 15, further comprising distributing processing of switching event information among the plurality of network elements.

24. A computer readable medium containing executable instructions which, when executed in a processing system, cause the processing system to route network switching event information, comprising:
   generating at least one data frame of a second type from at least one data frame of a first type, wherein the at least one data frame of a second type comprises switching event information;
   transferring and storing the at least one data frame of a second type among a plurality of network elements using a second network;
   performing at least one compare operation among pre-specified data frames of a second type;
   generating at least one interrupt signal in response to at least one detected change resulting from the at least one compare operation;
   controlling information routing in at least one network in response to the at least one interrupt signal; and
   generating at least one unit interrupt signal in response to the at least one detected change;
   generating at least one memory map in response to the at least one unit interrupt signal; and
   generating at least one massive interrupt signal in response to the at least one unit interrupt signal.

25. The computer readable medium of claim 24, further comprising distributing the at least one memory map among the plurality of network elements.

26. The computer readable medium of claim 24, further comprising:
   navigating among a plurality of memory locations using a plurality of memory maps in response to the at least one interrupt signal;
   reading data from the plurality of memory locations relating to the switching event information; and
   evaluating the switching event information.

27. The computer readable medium of claim 24, further comprising coupling an output of each of the plurality of network elements to an input of the plurality of network elements.

28. The computer readable medium of claim 24, wherein the at least one data frame of a first type is a Synchronous Optical Network (SONET) data frame, wherein the at least one data frame of a second type comprises 67.5 bytes comprising status bytes and SONET bytes including K1, K2, E1, and F1 bytes transferred as a serial bit stream at a rate of 4.32 megahertz.

29. The computer readable medium of claim 24, wherein the at least one detected change is an inequality among bits of the at least one data frame of a second type.

30. The computer readable medium of claim 24, wherein the storing comprises multiplexing the at least one data frame of a second type from a plurality of ports into a memory area of a dual port random access memory.

31. The computer readable medium of claim 24, further comprising receiving the at least one data frame of a first type from a plurality of network ports distributed among a plurality of switch cards.

32. The computer readable medium of claim 24, further comprising distributing processing of switching event information among the plurality of network elements.

33. An electromagnetic medium containing executable instructions which, when executed in a processing system, cause the processing system to route network switching event information, comprising:
   generating at least one data frame of a second type from at least one data frame of a first type, wherein the at least one data frame of a second type comprises switching event information;
   transferring and storing the at least one data frame of a second type among a plurality of network elements using a second network;
   performing at least one compare operation among pre-specified data frames of a second type;
   generating at least one interrupt signal in response to at least one detected change resulting from the at least one compare operation;
   controlling information routing in at least one network in response to the at least one interrupt signal; and
   generating at least one unit interrupt signal in response to the at least one detected change; p1 generating at least one memory map in response to the at least one unit interrupt signal; and
   generating at least one massive interrupt signal in response to the at least one unit interrupt signal.

34. The electromagnetic medium of claim 33, further comprising:
   navigating among a plurality of memory locations using a plurality of memory maps in response to the at least one interrupt signal;
   reading data from the plurality of memory locations relating to the switching event information; and
   evaluating the switching event information.

35. The electromagnetic medium of claim 33, further comprising coupling an output of each of the plurality of network elements to an input of the plurality of network elements.

36. The electromagnetic medium of claim 33, wherein the at least one data frame of a first type is a Synchronous Optical Network (SONET) data frame, wherein the at least one data frame of a second type comprises 67.5 bytes comprising status bytes and SONET bytes including K1, K2, E1, and F1 bytes transferred as a serial bit stream at a rate of 4.32 megahertz.

37. The electromagnetic medium of claim 33, wherein the at least one detected change is an inequality among bits of the at least one data frame of a second type.

38. The electromagnetic medium of claim 33, wherein the storing comprises multiplexing the at least one data frame of a second type from a plurality of ports into a memory area of a dual port random access memory.

39. The electromagnetic medium of claim 33, further comprises receiving the at least one data frame of a first type from a plurality of network ports distributed among a plurality of switch cards.

* * * * *